US012776939B2

(12) United States Patent
Feng et al.

(10) Patent No.: US 12,776,939 B2
(45) Date of Patent: *Oct. 27, 2026

(54) SIGNAL GENERATION METHOD AND APPARATUS

(71) Applicant: Huawei Technologies Co., Ltd., Shenzhen (CN)

(72) Inventors: Qi Feng, Shanghai (CN); Yuanzhou Hu, Shanghai (CN); Gaoning He, Boulogne-Billancourt (FR); Jianmin Lu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

This patent is subject to a terminal disclaimer.

(21) Appl. No.: 18/902,381

(22) Filed: Sep. 30, 2024

(65) Prior Publication Data

US 2025/0106088 A1 Mar. 27, 2025

Related U.S. Application Data

(63) Continuation of application No. 18/175,186, filed on Feb. 27, 2023, now Pat. No. 12,137,019, which is a (Continued)

(30) Foreign Application Priority Data

Aug. 31, 2020 (CN) ........................ 202010897996.6

(51) Int. Cl.
*H04L 27/26* (2006.01)

(52) U.S. Cl.
CPC .... *H04L 27/2637* (2013.01); *H04L 27/26025* (2021.01); *H04L 27/264* (2013.01)

(58) Field of Classification Search
CPC .............. H04J 11/0026; H04L 27/2637; H04L 27/2607; H04L 27/26025; H04L 27/2602;
(Continued)

(56) References Cited

U.S. PATENT DOCUMENTS 7,010,048 B1 * 3/2006 Shattil ................. H04J 13/0077 375/259
10,389,568 B1 * 8/2019 Shattil ..................... H04J 13/12
(Continued)

OTHER PUBLICATIONS

A. Sahin, I. Guvenc, and H. Arslan, A survey on multicarrier communications: Prototype filters, lattice structures, and implementation aspects, IEEE Commun. Survey and Tutorials, vol. 16, No. 3, pp. 1312-1338, Third Quarter, 2014.
(Continued)

*Primary Examiner* — Nader Bolourchi
(74) *Attorney, Agent, or Firm* — Slater Matsil, LLP

(57) ABSTRACT

This application provides a signal generation method and an apparatus. In the method, a first communication apparatus generates a first signal, and sends the first signal to a second communication apparatus, who receives the first signal, and then demodulates the first signal. A symbol included in the first signal is carried on K+2(M−1) subcarriers. Middle K subcarriers are valid subcarriers, start M−1 subcarriers and last M−1 subcarriers are redundant subcarriers, and a subcarrier spacing between adjacent subcarriers is related to a feature of a time domain pulse used to shape the subcarrier, wherein a width of each of some or all side lobes of a spectrum of the time domain pulse is equal to 1/M of a main lobe width of the time domain pulse, the subcarrier spacing is 1/M of the main lobe width. K is a positive integer, and M is a positive integer greater than 1.

20 Claims, 21 Drawing Sheets

Related U.S. Application Data continuation of application No. PCT/CN2021/112601, filed on Aug. 13, 2021.

(58) Field of Classification Search

CPC ............ H04L 25/03828; H04L 27/264; H04L 5/0094; H04L 2025/03414; H04L 25/03012; H04L 25/03834

See application file for complete search history.

(56) References Cited

U.S. PATENT DOCUMENTS

| | | | | |
|---|---|---|---|---|
| 11,075,786 | B1 * | 7/2021 | Shattil | H04B 7/024 |
| 2003/0147655 | A1 * | 8/2003 | Shattil | H04L 27/00<br>398/76 |
| 2018/0191423 | A1 | 7/2018 | Qu et al. | |
| 2019/0081838 | A1 | 3/2019 | Qu et al. | |
| 2019/0081839 | A1 | 3/2019 | Qu et al. | |

OTHER PUBLICATIONS

F. Rusek and J. B. Anderson, Multistream faster than Nyquist signaling, IEEE Trans. Commun., vol. 57, No. 5, pp. 1329-1340, May 2009.

H. Nam, et al, A new filter-bank multicarrier system with two prototype filters for QAM symbols transmission and reception, IEEE Trans. Wireless Commun., vol. 15, No. 9, pp. 5998-6009, Sep. 2016.

J. B. Anderson, F. Rusek, and V. Owall, Faster-than-Nyquist signaling, Proc. of the IEEE, vol. 101, No. 8, pp. 1817-1830, Aug. 2013.

M. Bellanger, FS-FBMC: An alternative scheme for filter bank based multicarrier transmission, in Proc. IEEE 5th ISCCSP, May 2012, pp. 1-4, Rome, Italy.

N. Michailow, et al, Generalized frequency division multiplexing for 5th generation cellular networks, IEEE Trans. Commun., vol. 62, No. 9, pp. 3045-3061, Sep. 2014.

P. Kabal and S. Pasupathy, Partial-response signaling, IEEE Trans. Commun., vol. com-23, No. 9, pp. 921-934, Sep. 1975.

* cited by examiner (a) OFDM spectrum of a rectangular window (b) OFDM spectrum of a raised cosine pulse (c) Spectrum of a raised cosine pulse whose subcarrier spacing is halved

SIGNAL GENERATION METHOD AND APPARATUS

CROSS-REFERENCE TO RELATED APPLICATIONS

This application is a continuation of U.S. patent application Ser. No. 18/175,186, filed on Feb. 27, 2023, which is a continuation of International Application No. PCT/CN2021/112601, filed on Aug. 13, 2021, which claims priority to Chinese Patent Application No. 202010897996.6, filed on Aug. 31, 2020. All of the afore-mentioned patent applications are hereby incorporated by reference in their entireties.

TECHNICAL FIELD

This application relates to the field of communication technologies, and in particular, to a signal generation method and an apparatus.

BACKGROUND

In wireless communication, a current mainstream waveform transmission scheme is multicarrier transmission, and is featured by high-rate transmission, support for multiuser diversity, low equalization complexity, an adaptive modulation and coding technology, and the like. For example, FIG. 1*a* is a block diagram of an implementation of a multicarrier transmission scheme. A transmitter integrates all modulated symbols in time-frequency domain by using a shaping filter, to obtain a to-be-sent signal, and sends the to-be-sent signal. A receiver receives the sent signal transmitted through a channel, and then parses the sent signal by using a corresponding matching filter, to obtain a demodulated signal.

In various multicarrier transmission technologies, in an orthogonal frequency division multiplexing (OFDM) technology, mutually orthogonal subcarriers are used to carry a signal. The OFDM technology has advantages such as a simple structure, an easy implementation, and support for a plurality of antennas, and becomes a multicarrier transmission technology widely applied to a long term evolution (LTE) system or a new radio (NR) system.

However, as a communication technology develops, there may be a requirement for more diversified future cellular networks, and an OFDM waveform based on an orthogonal subcarrier and Nyquist sampling is likely no longer applicable.

SUMMARY

Embodiments of this application provide a signal generation method and an apparatus, to increase density of subcarriers, improve spectral efficiency, and reduce equalization complexity of a receiver.

To achieve the foregoing objective, the following technical solutions are used in embodiments of this application.

According to a first aspect, a signal generation method is provided. In the method, a first communication apparatus generates a first signal, and sends the first signal. A symbol included in the first signal is carried on K+2(M−1) subcarriers, and a time domain pulse used to shape the subcarriers satisfies the following condition: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1.

Based on this solution, the subcarrier spacing between adjacent subcarriers is 1/M of the main lobe width of the spectrum of the time domain pulse. In other words, in this application, density of subcarriers is increased, to increase grid density, and improve spectral efficiency. In addition, because the width of each of the some or all side lobes of the spectrum of the time domain pulse is equal to 1/M of the main lobe width, and the subcarrier spacing between adjacent subcarriers is 1/M of the main lobe width of the spectrum of the time domain pulse, a subcarrier may be non-orthogonal to 2(M−1) subcarriers in the K+2(M−1) subcarriers, but orthogonal to another subcarrier. Therefore, compared with a solution in which all subcarriers are non-orthogonal, in this solution, equalization complexity of a receiver can be reduced. In addition, because the start M−1 subcarriers and the last M−1 subcarriers are redundant subcarriers, interference between different users can be reduced, and a Doppler frequency shift can be resisted. In other words, in the solution of this application, when the spectral efficiency is improved, a symbol on a $k^{th}$ subcarrier is interfered with by only symbols carried on 2(M−1) subcarriers related to the symbol, and is not interfered with by a symbol carried on another subcarrier. Herein, $k \in \{0, 1, 2, \ldots, K+2(M-1)-1\}$.

According to a second aspect, a signal generation method is provided. In the method, a second communication apparatus receives a first signal, and demodulates the first signal. A symbol included in the first signal is carried on K+2(M−1) subcarriers, and a time domain pulse used to shape the subcarriers satisfies the following condition: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1. For a technical effect brought by the second aspect, refer to a technical effect brought by the first aspect. Details are not described herein again.

With reference to the first aspect and the second aspect, in some possible designs, the first signal includes a time domain self-cyclic pulse signal that includes L time domain pulses and that has a length of βTL, T is a window length of the time domain pulse, βT is a pulse interval between adjacent time domain pulses, L is a positive integer, and β is a positive number.

With reference to the first aspect and the second aspect, in some possible designs, β is greater than or equal to 1/M, and is less than or equal to 1. In other words, $1/M \le \beta \le 1$. Based on this possible design, when a value of β is less than 1, the time domain pulses overlap. In other words, density of time domain pulses is increased, to reduce out-of-band attenuation and improve spectral efficiency. When the value of β is a minimum value 1/M, in the L time domain pulses, interference exists between an $l_{th}$ time domain pulse and each of M−1 adjacent time domain pulses that are located on each of a left side and a right side of the $l_{th}$ time domain pulse. The $l_{th}$ time domain pulse is orthogonal to another time domain pulse. In other words, no interference exists. In this case, time domain pulse density may be highest. When the value of β is a maximum value 1, no interference exists between the L time domain pulses. In this case, it is equivalent to that the time domain pulses are orthogonal to each other.

With reference to the first aspect and the second aspect, in some possible designs, the value of β may be ½. In this case, the $l_{th}$ time domain pulse interferes with only one adjacent time domain pulse that is located on each of the left side and the right side of the $l_{th}$ time domain pulse, and is orthogonal to another time domain pulse. Therefore, when little interference exists between time domain pulses, density of time domain pulses is increased, to improve the spectrum efficiency and reduce out-of-band attenuation.

With reference to the first aspect and the second aspect, in some possible designs, the first signal satisfies the following formula:

$$s(t)=\begin{cases}\sum_{k=0}^{K+(2M-1)-1}\overline{a}_{k,1}g(t-\beta T)e^{j2\pi(k-1-K/2)(t-\beta T)/T}+ & 0\le t<\beta T\\ \sum_{k=0}^{K+(2M-1)-1}\overline{a}_{k,L}g(t)e^{j2\pi(k-1-K/2)t/T}, & \\ \sum_{l=1}^{L}\sum_{k=0}^{K+(2M-1)-1}\overline{a}_{k,l}g(t-\beta lT)e^{j2\pi(k-1-K/2)(t-\beta lT)/T}, & \beta T\le t<\beta TL\end{cases}$$

Herein, s(t) is the first signal, g(t) is the time domain pulse, $\overline{a}_{k,l}$ is a symbol carried on an $l_{th}$ time domain pulse of a $k_{th}$ subcarrier $k\in\{1, 2, \ldots, K+2(M-1)\}$, and $l\in\{1, 2, \ldots, L\}$.

With reference to the first aspect and the second aspect, in some possible designs, the first signal further includes a time domain cyclic prefix. Based on this possible design, after the time domain cyclic prefix is added, the first signal can resist multipath interference.

With reference to the first aspect and the second aspect, in some possible designs, the first signal satisfies the following formula:

$$s(t)=\begin{cases}\sum_{k=0}^{K+(2M-1)-1}\overline{a}_{k,L-1}g(t+\beta T)e^{j2\pi(k-1-K/2)(t+\beta T)/T}+ & -T_{CP}\le t<0\\ \sum_{k=0}^{K+(2M-1)-1}\overline{a}_{k,L}g(t)e^{j2\pi(k-1-K/2)t/T}, & \\ \sum_{k=0}^{K+(2M-1)-1}\overline{a}_{k,1}g(t-\beta T)e^{j2\pi(k-1-K/2)(t-\beta T)/T}+ & 0\le t<\beta T\\ \sum_{k=0}^{K+(2M-1)-1}\overline{a}_{k,L}g(t)e^{j2\pi(k-1-K/2)t/T}, & \\ \sum_{l=1}^{L}\sum_{k=0}^{K+(2M-1)-1}\overline{a}_{k,l}g(t-\beta lT)e^{j2\pi(k-1-K/2)(t-\beta lT)/T}, & \beta T\le t<\beta TL\end{cases}$$

Herein, s(t) is the first signal, g(t) is the time domain pulse, $\overline{a}_{k,l}$ is a symbol carried on an $l_{th}$ time domain pulse of a $k_{th}$ subcarrier, $k\in\{1, 2, \ldots, K+2(M-1)\}$, $l\in\{1, 2, \ldots, L\}$, and $T_{CP}$ is a length of the time domain cyclic prefix.

With reference to the first aspect and the second aspect, in some possible designs, M is equal to 2.

With reference to the first aspect and the second aspect, in some possible designs, the time domain pulse is a raised cosine pulse, a window length of the raised cosine pulse is T, and a roll-off factor is 1. Based on this possible design, the $k^{th}$ subcarrier may be non-orthogonal to one adjacent subcarrier that is located on each of a left side and a right side of the $k^{th}$ subcarrier, and is orthogonal to another subcarrier, to reduce a quantity of non-orthogonal subcarriers.

With reference to the first aspect and the second aspect, in some possible designs, the symbol included in the first signal is a modulated symbol; or the symbol included in the first signal is a symbol obtained after K-dimensional discrete Fourier transform spread is performed on a modulated symbol. Based on this possible design, discrete Fourier transform spread is introduced at a transmit end, to reduce a peak-to-average power ratio. In addition, a receive end does not need to perform discrete Fourier transform, to relatively reduce complexity of the receive end.

With reference to the first aspect and the second aspect, in some possible designs, the start M−1 subcarriers in the K+2(M−1) subcarriers are used to carry a frequency domain cyclic prefix, and the last M−1 subcarriers are used to carry a frequency domain cyclic suffix.

With reference to the first aspect and the second aspect, in some possible designs, the start M−1 subcarriers and the last M−1 subcarriers in the K+2(M−1) subcarriers are padded with zero. Based on this possible design, because the redundant subcarrier is padded with zero, transmit power of the 2(M−1) subcarriers can be reduced, to reduce interference of the redundant subcarrier to an adjacent subcarrier of the redundant subcarrier.

According to a third aspect, a communication apparatus is provided, to implement the foregoing methods. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus. The communication apparatus includes a corresponding module, unit, or means for implementing the foregoing methods. The module, unit, or means may be implemented by hardware or software, or may be implemented by hardware by executing corresponding software. The hardware or the software includes one or more modules or units corresponding to the foregoing functions.

According to a fourth aspect, a communication apparatus is provided, including a processor and a memory. The memory is configured to store computer instructions. When the processor executes the instructions, the communication apparatus is enabled to perform the method according to either of the foregoing aspects. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus.

According to a fifth aspect, a communication apparatus is provided, including a processor and an interface circuit. The interface circuit is configured to communicate with a module outside the communication apparatus. The processor is configured to run a computer program or instructions, to perform the method according to either of the foregoing aspects. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus.

Alternatively, the interface circuit may be a code/data read/write interface circuit. The interface circuit is configured to: receive computer-executable instructions (the computer-executable instructions are stored in a memory, and may be directly read from the memory, or may pass through another component), and transmit the computer-executable instructions to the processor, so that the processor runs the computer-executable instruction, to perform the method according to either of the foregoing aspects.

In some possible designs, the communication apparatus may be a chip or a chip system.

According to a sixth aspect, a communication apparatus is provided, including a processor. The processor is configured to: be coupled to a memory, and after reading instructions in the memory, perform the method according to either of the foregoing aspects based on the instructions. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus.

According to a seventh aspect, a computer-readable storage medium is provided. The computer-readable storage medium stores instructions. When the instructions are executed on a communication apparatus, the communication apparatus is enabled to perform the method according to either of the foregoing aspects. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus.

According to an eighth aspect, a computer program product including instructions is provided. When the computer program product runs on a communication apparatus, the communication apparatus may be enabled to perform the method according to either of the foregoing aspects. The communication apparatus may be the first communication apparatus in the first aspect, or an apparatus including the first communication apparatus, or an apparatus included in the first communication apparatus, for example, a chip; or the communication apparatus may be the second communication apparatus in the second aspect, or an apparatus including the second communication apparatus, or an apparatus included in the second communication apparatus.

According to a ninth aspect, a communication apparatus (for example, the communication apparatus may be a chip or a chip system) is provided. The communication apparatus includes a processor, configured to implement a function according to any one of the foregoing aspects. In a possible design, the communication apparatus further includes a memory. The memory is configured to store necessary program instructions and data. When the communication apparatus is a chip system, the communication apparatus may include a chip, or may include a chip and another discrete component.

For technical effects brought by any design manner of the third aspect to the ninth aspect, refer to technical effects brought by different design manners of the first aspect or the second aspect. Details are not described herein again.

According to a tenth aspect, a communication system is provided. The communication system includes the first communication apparatus according to the foregoing aspects and the second communication apparatus according to the foregoing aspects.

DETAILED DESCRIPTION OF ILLUSTRATIVE EMBODIMENTS

To help understand the solutions in embodiments of this application, related technologies are first briefly described as follows:

Currently, a general form of a complex baseband signal in an OFDM technology may be represented as follows:

$$s(t) = \sum_{l=-\infty}^{+\infty} \sum_{k=0}^{K-1} a_{k,l} g(t - lT) e^{j2\pi k\Delta ft}$$

Herein, k represents a subcarrier index; l represents a time index, or represents a time domain pulse interval; $a_{k,l}$ represents a modulated symbol; K represents a quantity of subcarriers; g(t) represents a shaping filter, or represents a time domain pulse; T represents a pulse interval, and Δf represents a subcarrier spacing.

Figure 1A:
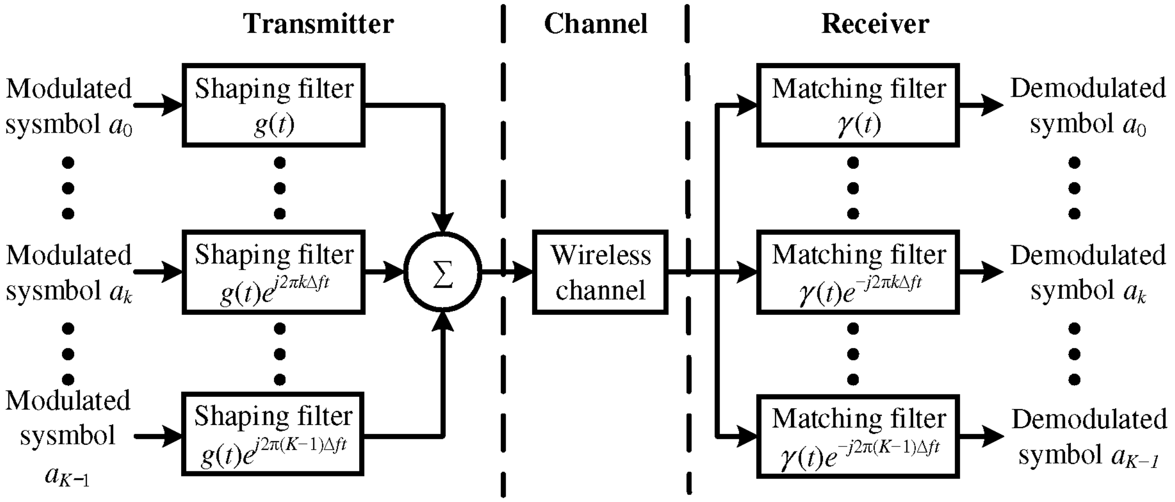
FIG. 1*a* is a block diagram of an implementation of a multicarrier transmission scheme.
Figure 1B:
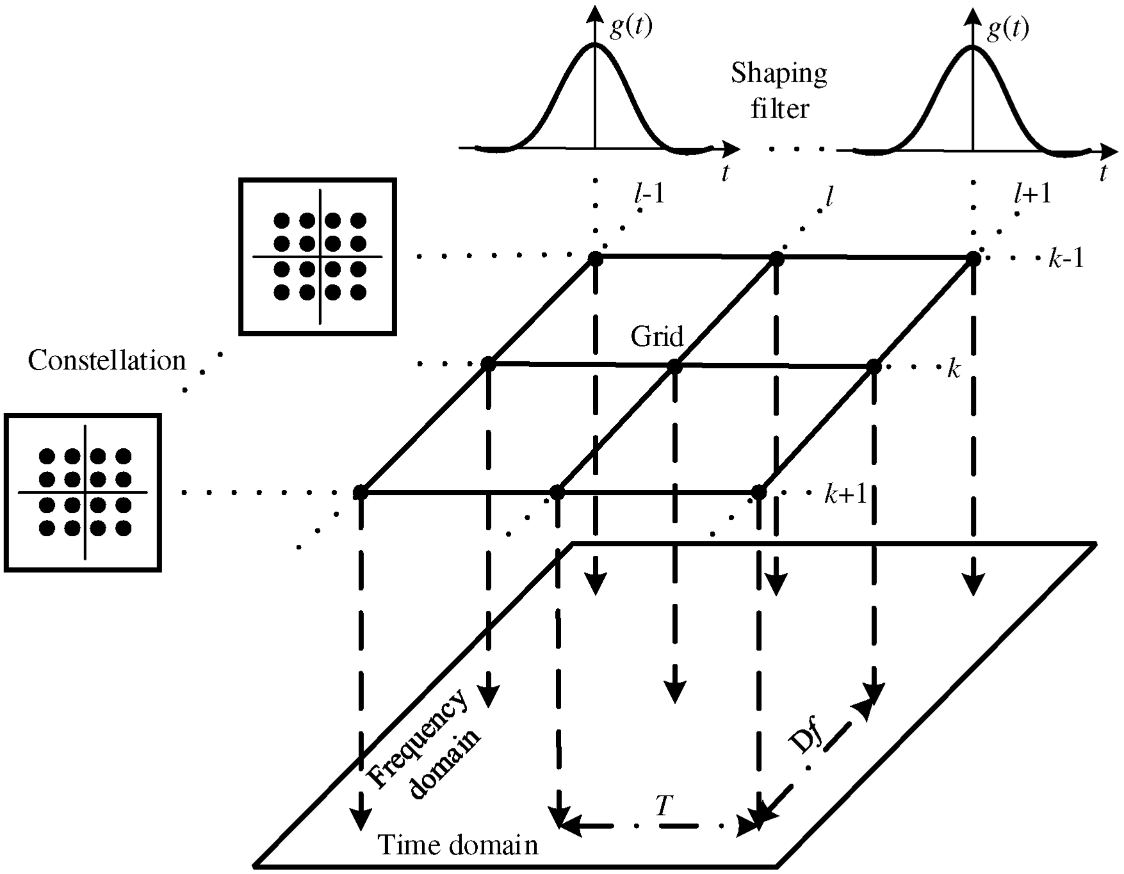
FIG. 1*b* is a schematic diagram of structures of a constellation diagram, a shaping filter, and a grid.

With reference to a form of the complex baseband signal, as shown in FIG. 1*b*, a constellation diagram, a shaping filter, and a grid form basic elements of multicarrier transmission. The constellation diagram is used to represent a signal on a complex plane, to intuitively represent a relationship between signals. A point on the constellation diagram is referred to as a constellation point, one constellation point represents one signal, a vector length of the constellation point represents an amplitude of the signal, and a vector angle of the constellation point represents a phase of the signal. The shaping filter can be understood as a time domain pulse. One grid includes one time domain pulse in time domain and one subcarrier in frequency domain. The grid may also be referred to as a time-frequency grid.

Usually, the following three indicators are used to measure performance of a multicarrier transmission scheme: (i) Orthogonality by shift: simple receiver; (ii) Time-frequency centralization: small out-of-band attenuation; (iii) Tight grid: high spectral efficiency. Based on a Balian-Low theorem, the three characteristics cannot be all met in any design of $g(t-lT)e^{j2\pi k\Delta ft}$. Therefore, any multicarrier waveform design is to make a trade-off among the three performance indicators. A grid tightness degree may be represented by a product of a pulse interval and a subcarrier spacing, and the grid tightness degree may also be referred to as grid density.

However, as a communication technology develops, there may be a requirement for more diversified future cellular networks, and an OFDM waveform based on an orthogonal subcarrier and Nyquist sampling is likely no longer applicable. Based on this, this application provides a signal generation method, to design a new waveform to adapt to the requirement for more diversified future cellular networks.

It can be understood that the waveform is an image abstraction of a distribution situation of a signal in terms of time or a frequency. In this application, the terms "signal" and "waveform" may be changed with each other.

The following describes technical solutions in embodiments of this application with reference to the accompanying drawings in embodiments of this application. In descriptions of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof indicates any combination of these items, including any combination of a single item (piece) or a plurality of items (pieces). For example, at least one item (piece) of a, b, or c may indicate a, b, c, a and b, a and c, b and c, or a, b, and c. Herein, a, b, and c may be singular or plural.

Figure 2:
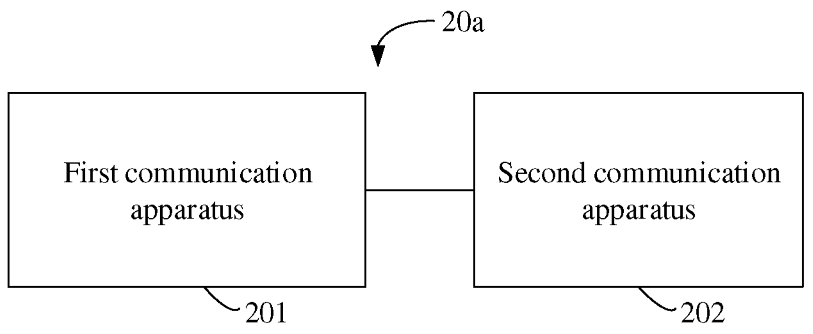
FIG. 2 is a schematic diagram of an architecture of a communication system according to an embodiment of this application.

In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner, to facilitate understanding FIG. 2 shows a communication system 20*a* according to this application. The communication system 20*a* includes a first communication apparatus 201 and a second communication apparatus 202.

Optionally, the first communication apparatus 201 and the second communication apparatus 202 may be devices of different types. For example, one of the first communication apparatus 201 and the second communication apparatus 202 is a network device, and the other is a terminal device. Alternatively, the first communication apparatus 201 and the second communication apparatus 202 may be devices of a same type. For example, the first communication apparatus 201 and the second communication apparatus 202 each are a terminal device, or the first communication apparatus 201 and the second communication apparatus 202 each are a network device. This is not specifically limited in this embodiment of this application.

Optionally, the communication system shown in FIG. 2 may be various communication systems such as a 5th generation (5G) communication system, a 6th generation (6G) communication system, a satellite communication system, a non-terrestrial network (NTN), or a future evolved communication system. Terms "system" and "network" may be changed with each other. The 5G communication system is a next-generation communication system under research. The 5G communication system includes a 5G non-standalone (NSA) mobile communication system, a 5G standalone (SA) mobile communication system, or both a 5G NSA mobile communication system and a 5G SA mobile communication system. In addition, the communication systems may be further applied to a future-oriented communication technology, and are all applicable to the technical solutions provided in embodiments of this application.

The provided communication system is merely an example for description. It can be understood that a communication system to which the solutions of this application are applied is not limited thereto. This is uniformly described herein. Details are not described below again.

Interaction between the first communication apparatus 201 and the second communication apparatus 202 shown in FIG. 2 is used as an example. In this application, the first communication apparatus 201 generates a first signal, and sends the first signal to the second communication apparatus 202. Correspondingly, the second communication apparatus 202 receives and demodulates the first signal. A symbol included in the first signal is carried on K+2(M−1) subcarriers, and a time domain pulse used to shape the subcarriers satisfies the following condition: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1.

Based on this solution, the subcarrier spacing between adjacent subcarriers is 1/M of the main lobe width of the spectrum of the time domain pulse. In other words, in this application, density of subcarriers is increased, to increase grid density, and improve spectral efficiency. In addition, because the width of each of the some or all side lobes of the spectrum of the time domain pulse is equal to 1/M of the main lobe width, and the subcarrier spacing between adjacent subcarriers is 1/M of the main lobe width of the spectrum of the time domain pulse, a subcarrier may be non-orthogonal to 2(M−1) subcarriers in the K+2(M−1) subcarriers, but orthogonal to another subcarrier. Therefore, compared with a solution in which all subcarriers are non-orthogonal, in this solution, equalization complexity of a receiver can be reduced. In addition, because the start M−1 subcarriers and the last M−1 subcarriers are redundant subcarriers, interference between different users can be reduced, and a Doppler frequency shift can be resisted.

Figure 3:
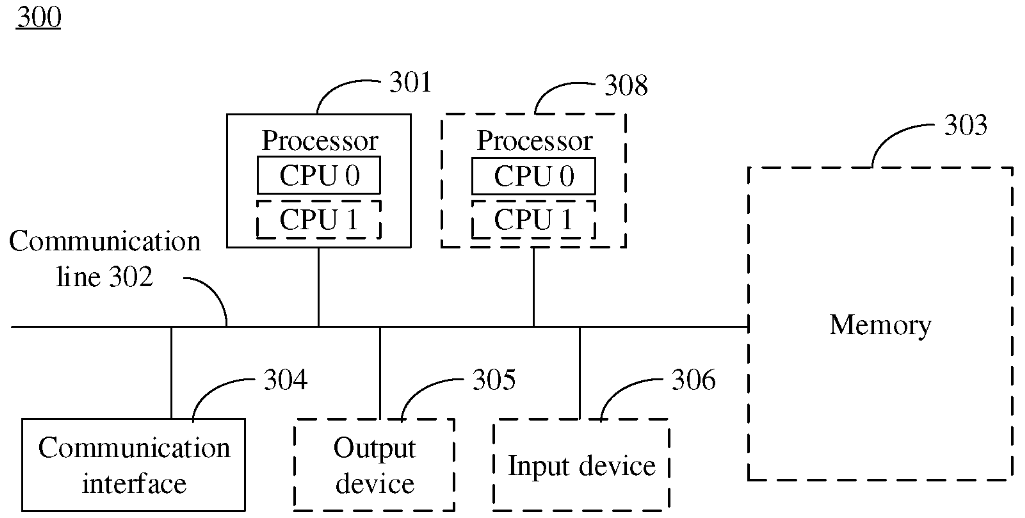
FIG. 3 is a schematic diagram of a structure of a communication apparatus according to an embodiment of this application.

Optionally, the first communication apparatus 201 or the second communication apparatus 202 may be implemented by using a communication apparatus in FIG. 3. FIG. 3 is a schematic diagram of a hardware structure of a communication apparatus 300 according to this application. The communication apparatus 300 includes a processor 301, a communication line 302, and at least one communication interface (an example in which the communication apparatus 300 includes a communication interface 304 is only used for description in FIG. 3). Optionally, the communication apparatus 300 may further include a memory 303.

The processor 301 may be a general-purpose central processing unit (CPU), a microprocessor, an application-specific integrated circuit (ASIC), or one or more integrated circuits configured to control program execution of the solutions of this application.

The communication line 302 may include a path for transmitting information between the foregoing components.

The communication interface 304 is any apparatus of a transceiver type, and is configured to communicate with another device or a communication network, for example, the Ethernet, a radio access network (RAN), or a wireless local area network (WLAN).

The memory 303 may be a read-only memory (ROM) or another type of static storage device that may store static information and instructions, or a random access memory (RAM) or another type of dynamic storage device that may store information and instructions; or may be an electrically erasable programmable read-only memory (EEPROM), a compact disc read-only memory (CD-ROM), or another compact disc storage, an optical disc storage (including a compact disc, a laser disc, an optical disc, a digital versatile disc, and a Blu-ray disc, or the like), a disk storage medium or another disk storage device, or any other medium that can be used to carry or store expected program code in an instruction or data structure form and that can be accessed by a computer. However, the memory 303 is not limited thereto. The memory may exist independently, and is connected to the processor through the communication line 302. The memory may alternatively be integrated with the processor.

The memory 303 is configured to store computer-executable instructions for performing the solutions of this application, and the processor 301 controls execution. The processor 301 is configured to execute the computer-executable instructions stored in the memory 303, to implement a signal generation method provided in the following embodiments of this application.

Optionally, the computer-executable instructions in this embodiment of this application may also be referred to as application program code or computer program code. This is not specifically limited in this embodiment of this application.

In a specific implementation, in an embodiment, the processor 301 may include one or more CPUs such as a CPU 0 and a CPU 1 in FIG. 3.

In a specific implementation, in an embodiment, the communication apparatus 300 may include a plurality of processors such as the processor 301 and a processor 308 in FIG. 3. Each of the processors may be a single-core (single-CPU) processor or a multi-core (multi-CPU) processor. Herein, the processor may be one or more devices, circuits, and/or processing cores configured to process data (for example, computer program instructions).

In a specific implementation, in an embodiment, the communication apparatus 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive a user input in a plurality of manners. For example, the input device 306 may be a mouse, a keyboard, a touchscreen device, or a sensor device.

Figure 4:
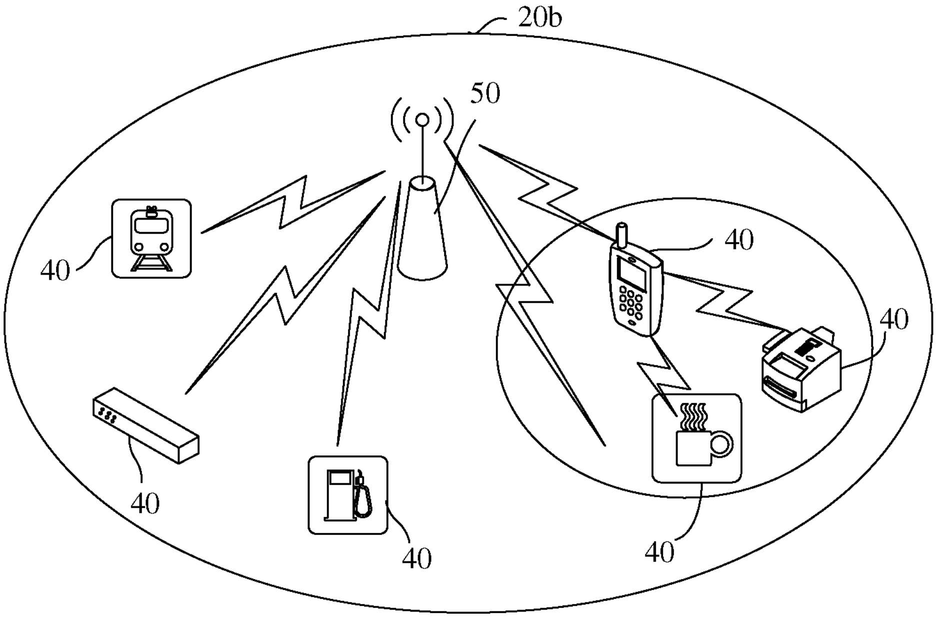
FIG. 4 is a schematic diagram of an architecture of another communication system according to an embodiment of this application.

In addition, for example, one of the first communication apparatus 201 and the second communication apparatus 202 is a network device, and the other is a terminal device. FIG. 4 shows another communication system 20*b* according to this application. The communication system 20*b* includes at least one network device 50 and one or more terminal devices 40 connected to the network device 50. Optionally, different terminal devices 40 may communicate with each other.

The network device 50 may be used as the first communication apparatus 201 in FIG. 2. In this case, the terminal device 40 is used as the second communication apparatus 202 in FIG. 2. Alternatively, the network device 50 may be used as the second communication apparatus 202 in FIG. 2. In this case, the terminal device 40 is used as the first communication apparatus 201 in FIG. 2.

Optionally, the network device 50 in this embodiment of this application is a device that connects the terminal device 40 and a wireless network. The network device 50 may be a node in a radio access network, and may also be referred to as a base station, or may be referred to as a radio access network (RAN) node (or device). For example, the network device may include an evolved NodeB (NodeB or eNB or e-NodeB) in a long term evolution (LTE) system or an LTE-advanced system (LTE-A), for example, a conventional macro base station eNB and a micro base station eNB in a heterogeneous network scenario; or may include a next generation nodeB (gNB) in a 5G new radio (NR) system, or may further include a transmission reception point (TRP), a home base station (for example, a home evolved NodeB, or a home NodeB, HNB), a baseband unit (BBU), a baseband pool BBU pool, a Wi-Fi access point (AP), or the like; or may further include a centralized unit (CU) and a distributed unit (DU) in a cloud access network (CloudRAN) system; or may include a network device in a non-terrestrial network (NTN), in other words, may be deployed on a high-altitude platform or a satellite. In the NTN, the network device may be used as a layer 1 (L1) relay, or may be used as a base station, or may be used as a DU, or may be used as an integrated access and backhaul (IAB) node. This is not limited in this embodiment of this application.

Optionally, the terminal device 40 in this embodiment of this application may be a device configured to implement a wireless communication function, for example, a terminal or a chip that can be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. Alternatively, the terminal may be a terminal (for example, an internet of vehicles device) in the vehicle-to-everything (V2X), a terminal in device-to-device (Device to Device) communication, a terminal in machine-to-machine (M2M) communication, or the like. The terminal may be mobile or fastened.

Figure 5:
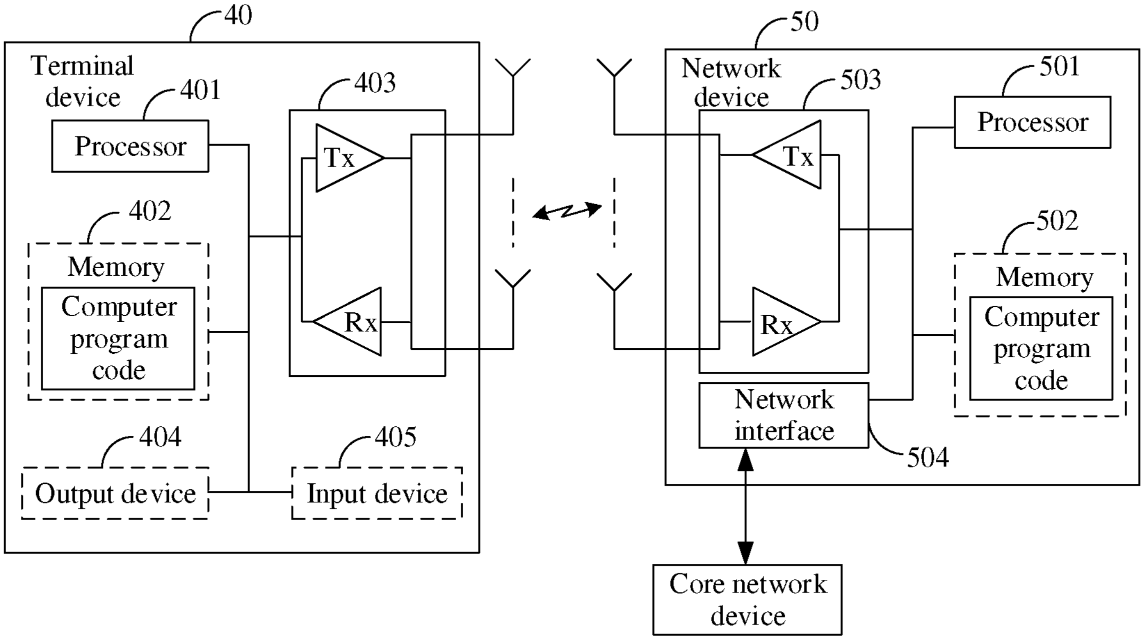
FIG. 5 is a schematic diagram of structures of a terminal device and a network device according to an embodiment of this application.

Optionally, FIG. 5 is a schematic diagram of structures of a network device 50 and a terminal device 40 according to an embodiment of this application.

The terminal device 40 includes at least one processor (an example in which the terminal device 40 includes one processor 401 is used for description in FIG. 5) and at least one transceiver (an example in which the terminal device 40 includes one transceiver 403 is used for description in FIG. 5). Optionally, the terminal device 40 may further include at least one memory (an example in which the terminal device 40 includes one memory 402 is used for description in FIG. 5), at least one output device (an example in which the terminal device 40 includes one output device 404 is used for description in FIG. 5), and at least one input device (an example in which the terminal device 40 includes one input device 405 is used for description in FIG. 5).

The processor 401, the memory 402, and the transceiver 403 are connected to each other through a communication line. The communication line may include a path for transmitting information between the foregoing components.

For related descriptions of the processor 401, the memory 402, the output device 404, and the input device 405, refer to the descriptions of the processor 301, the memory 303, the output device 305, and the input device 306 in the communication apparatus 300 shown in FIG. 3. Details are not described herein again.

The transceiver 403 may be any apparatus of a transceiver type, and is configured to communicate with another device or a communication network, for example, the Ethernet, a radio access network (RAN), or a wireless local area network (WLAN). The transceiver 403 includes a transmitter (Tx) and a receiver (Rx).

The memory 402 may exist independently, and is connected to the processor 401 through the communication line. The memory 402 may alternatively be integrated with the processor 401.

The memory 402 is configured to store computer-executable instructions for performing the solutions of this application, and the processor 401 controls execution. Specifically, the processor 401 is configured to execute the computer-executable instructions stored in the memory 402, to implement a signal generation method in embodiments of this application.

Alternatively, optionally, in this embodiment of this application, the processor 401 may perform a function related to processing in the signal generation method provided in the following embodiments of this application. The transceiver 403 is responsible for communicating with another device or a communication network. This is not specifically limited in this embodiment of this application.

The network device 50 includes at least one processor (an example in which the network device 50 includes one processor 501 is used for description in FIG. 5), at least one transceiver (an example in which the network device 50 includes one transceiver 503 is used for description in FIG. 5), and at least one network interface (an example in which the network device 50 includes one network interface 504 is used for description in FIG. 5). Optionally, the network device 50 may further include at least one memory (an example in which the network device 50 includes one memory 502 is used for description in FIG. 5). The processor 501, the memory 502, the transceiver 503, and the network interface 504 are connected by using a communication line. The network interface 504 is configured to: be connected to a core network device through a link (for example, an S1 interface), or be connected to a network interface of another network device through a wired or wireless link (for example, an X2 interface) (not shown in the FIG. 5). This is not specifically limited in this embodiment of this application. In addition, for related descriptions of the processor 501, the memory 502, and the transceiver 503, refer to the descriptions of the processor 401, the memory 402, and the transceiver 403 in the terminal device 40. Details are not described herein again.

It can be understood that the structures shown in FIG. 5 do not constitute a specific limitation on the terminal device 40 and the network device 50. For example, in some other embodiments of this application, the terminal device 40 or the network device 50 may include more or fewer components than those shown in the figure, or combine some components, or split some components, or have different component arrangements. The components shown in the figure may be implemented by hardware, software, or a combination of software and hardware.

With reference to FIG. 1 to FIG. 5, the following describes in detail the signal generation method provided in embodiments of this application by using interaction between the first communication apparatus 201 and the second communication apparatus 202 shown in FIG. 2 as an example.

It can be understood that, in this embodiment of this application, the first communication apparatus and/or the second communication apparatus may perform some or all of steps in embodiments of this application. These steps or operations are merely examples. In embodiments of this application, another operation or a variation of various operations may be further performed. In addition, the steps may be performed in a sequence different from a sequence presented in embodiments of this application, and not all the operations in embodiments of this application may be performed.

It should be noted that names of messages between apparatuses, names of parameters in the messages, or the like in the following embodiments of this application are merely examples, and there may be another name in a specific implementation. This is not specifically limited in embodiments of this application.

Figure 6:
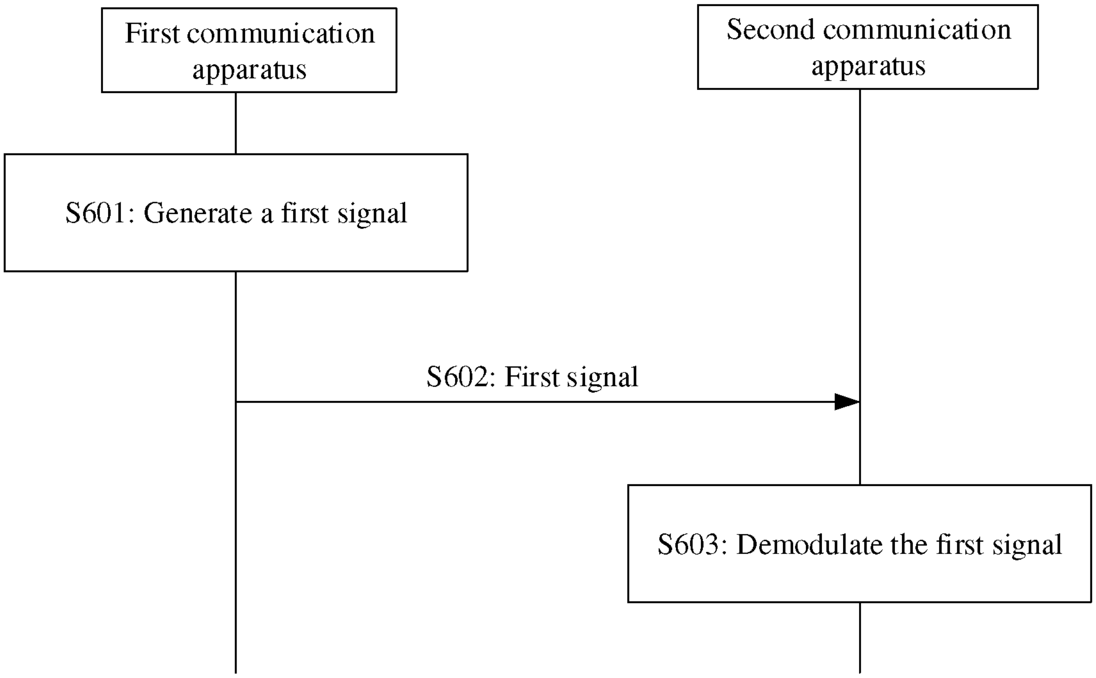
FIG. 6 is a schematic flowchart of a signal generation method according to an embodiment of this application.

FIG. 6 shows a signal generation method according to an embodiment of this application. The method includes the following steps.

S601: A first communication apparatus generates a first signal.

A feature of the first signal is described in a subsequent embodiment. Details are not described herein.

S602: The first communication apparatus sends the first signal to a second communication apparatus. Correspondingly, the second communication apparatus receives the first signal from the first communication apparatus.

S603: The second communication apparatus demodulates the first signal.

Optionally, after demodulating the first signal, the second communication apparatus may obtain a demodulated symbol corresponding to a symbol included in the first signal, and perform subsequent processing based on the demodulated symbol. This is not specifically limited in this embodiment of this application.

The following describes the first signal in detail.

The symbol included in the first signal is carried on K+2(M−1) subcarriers. A time domain pulse used to shape the subcarrier satisfies the following condition: a width of each of some or all side lobes of a spectrum of the time domain pulse is equal to 1/M of a main lobe width of the spectrum. Start M−1 subcarriers and last M−1 subcarriers in the K+2(M−1) subcarriers are redundant subcarriers. A subcarrier spacing between adjacent subcarriers is 1/M of the main lobe width of the spectrum of the time domain pulse. K is a positive integer, and M is a positive integer greater than 1.

In other words, in the K+2(M−1) subcarriers, middle K subcarriers may be considered as valid subcarriers, and that the symbol included in the first signal is carried on the K+2(M−1) subcarriers may be as follows: The symbol included in the first signal is carried on the K valid subcarriers in the K+2(M−1) subcarriers. A quantity of redundant subcarriers depends on a characteristic of the spectrum of the time domain pulse. When the width of each of the some or all side lobes of the spectrum of the time domain pulse is equal to 1/M of the main lobe width of the spectrum, a quantity of redundant subcarriers added on each side of the effective subcarriers is M−1.

It can be understood that, from a perspective of a time-frequency domain, a signal is carried on both a frequency domain subcarrier and a time domain pulse. Therefore, a symbol carried on a subcarrier may be considered as a symbol vector, including symbols carried on a plurality of time domain pulses of the subcarrier. From the perspective of a single symbol, one subcarrier and one time domain pulse carry one symbol.

Optionally, when the width of each of the some or all side lobes of the spectrum of the time domain pulse is equal to 1/M of the main lobe width of the spectrum, a quantity of redundant subcarriers added on each side of the effective subcarriers may alternatively be greater than M−1. In this case, according to this solution, a Doppler frequency shift in an ultra-high-speed movement scenario may be resisted. In other words, when the width of each of the some or all side lobes of the spectrum of the time domain pulse is equal to 1/M of the main lobe width of the spectrum, the quantity of redundant subcarriers added on each side of the effective subcarriers may be at least M−1.

It should be noted that the main lobe width may also be referred to as a main lobe bandwidth, and the main lobe width and the main lobe bandwidth may be changed with each other. That the width of each of some side lobes of the spectrum is equal to 1/M of the main lobe width may be as follows: A width of a side lobe starting from a $P^{th}$ side lobe (including the $P^{th}$ side lobe) of the spectrum is equal to 1/M of the width of the main lobe. Herein, P is a positive integer greater than 1. For example, a width of a $1^{st}$ side lobe of the spectrum is not equal to 1/M of a main lobe width, and a width of each of a $2^{nd}$ side lobe and a side lobe after the $2^{nd}$ side lobe is equal to 1/M of the main lobe width.

It should be noted that, if the width of each of the some or all side lobes of the spectrum is equal to 1/M of the main lobe width of the spectrum, it may be considered that the spectrum satisfies an M-order zero-crossing characteristic, and that the width of each of the some or all side lobes of the spectrum is equal to 1/M of the main lobe width of the spectrum and that the spectrum satisfies the M-order zero-crossing characteristic may be changed with each other.

Based on the characteristic, the subcarrier spacing between adjacent subcarriers is 1/M of the main lobe width of the spectrum of the time domain pulse. In other words, in this application, density of subcarriers is increased, to increase grid density, and improve spectral efficiency. In addition, because the width of each of the some or all side lobes of the spectrum of the time domain pulse is equal to 1/M of the main lobe width, and the subcarrier spacing between adjacent subcarriers is 1/M of the main lobe width of the spectrum of the time domain pulse, a subcarrier may be non-orthogonal to 2(M−1) subcarriers in the K+2(M−1) subcarriers, but orthogonal to another subcarrier. Therefore, compared with a solution in which all subcarriers are non-orthogonal, in this solution, equalization complexity of a receiver can be reduced. In addition, because the start M−1 subcarriers and the last M−1 subcarriers are redundant subcarriers, interference between different users can be reduced, and a Doppler frequency shift can be resisted.

In other words, in the solution of this application, when the spectral efficiency is improved, a symbol on a $k^{th}$ subcarrier is interfered with by only symbols carried on 2(M−1) subcarriers related to the symbol, and is not interfered with by a symbol carried on another subcarrier. Herein, $k \in \{0, 1, 2, \ldots, K+2(M-1)-1\}$.

It can be understood that when a time domain cyclic prefix is not considered, if spectral efficiency of OFDM is 1, after density of subcarriers is increased based on a subcarrier density increase solution provided in this application, theoretical spectral efficiency may be M. In addition, after M−1 redundant subcarriers are added on each of the two sides of the effective subcarriers, the spectral efficiency may be MK/(K+2M −2).

Optionally, a time domain pulse whose spectrum satisfies the M-order zero-crossing characteristic may be represented in the following form:

$$g(t)=\begin{cases}\alpha_0+2\sum_{h=1}^{H}\alpha_h\cos 2\pi ht/T, & -T/2\le t\le T/2\\ 0 & \text{others}\end{cases}$$

Herein, g(t) is the time domain pulse, T is a window length of the time domain pulse, H is a positive integer, and $\alpha_0, \alpha_1, \ldots, \alpha_h$ is a filter coefficient corresponding to the time domain pulse.

Optionally, in a possible implementation of this application, M is equal to 2. In other words, the width of each of the some or all side lobes of the spectrum of the time domain pulse is equal to ½ of the main lobe width of the spectrum. In other words, the spectrum of the time domain pulse satisfies a two-order zero-crossing characteristic.

Optionally, when M is equal to 2, the time domain pulse may be a raised cosine pulse, a window length of the raised cosine pulse is T, and a roll-off factor is 1. In this scenario, a width of each of all side lobes of a spectrum of the raised cosine pulse is equal to ½ of a main lobe width of the spectrum. Based on this solution, the $k^{th}$ subcarrier may be non-orthogonal to one adjacent subcarrier that is located on each of a left side and a right side of the $k^{th}$ subcarrier, and is orthogonal to another subcarrier, to reduce a quantity of non-orthogonal subcarriers.

Optionally, a raised cosine pulse g(t) whose window length is T and whose roll-off factor is 1 may be represented as follows:

$$g(t)=\begin{cases}(1+\cos 2\pi t/T)/2, & -T/2\le t\le T/2\\ 0 & \text{others}\end{cases}$$

Correspondingly, a frequency response G(f) of the raised cosine pulse g(t) may be represented as follows:

$$G(f)=\left\{\frac{\sin\pi Tf/2}{\pi Tf/2}\cdot\frac{\cos\pi Tf/2}{1-(Tf)^2}\right.$$

Figure 7:
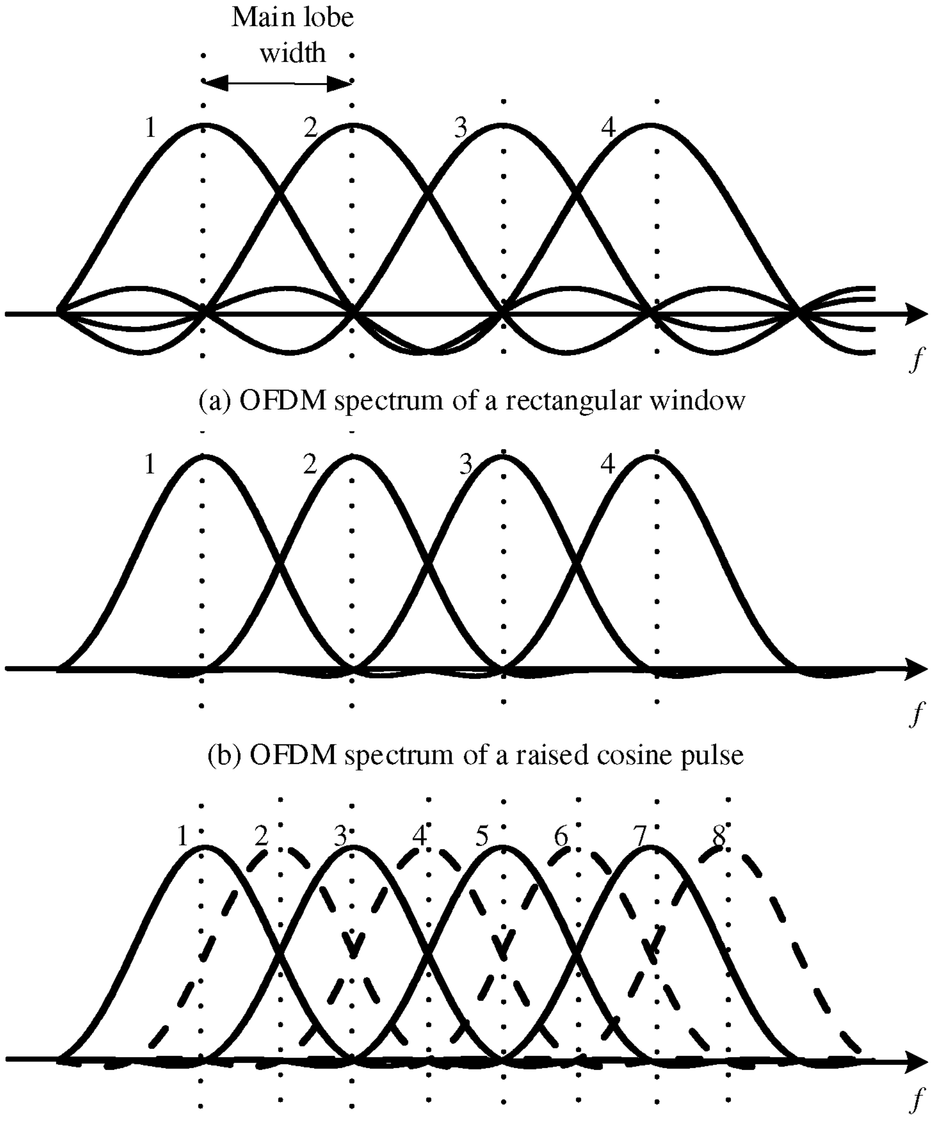
FIG. 7 is a schematic diagram of a spectrum according to an embodiment of this application.

For example, FIG. 7 is a schematic diagram of a spectrum of a rectangular window and a spectrum of a raised cosine pulse whose roll-off factor is 1. A window length of the rectangular window is T/2, and a window length of the raised cosine pulse is T. One spectrum in FIG. 7 may be considered as a spectrum obtained after a plurality of subcarriers shaped by using a same pulse are superimposed. Different subcarriers shaped by a same pulse have a same shape but have different frequency domain positions. One curve in FIG. 7 may be considered as one subcarrier.

As shown in FIG. 7, (a) is an OFDM spectrum of the rectangular window, and (b) is an OFDM spectrum of the raised cosine pulse whose roll-off factor is 1. In (a) and (b), a subcarrier spacing is equal to the main lobe width. In other words, subcarriers are orthogonal to each other. For example, a main lobe peak value of a subcarrier 2 in (a) and (b) is a zero point of a side lobe of another subcarrier. In other words, the another subcarrier does not interfere with the subcarrier 2.

Herein, (c) is a spectrum that is of a raised cosine pulse whose subcarrier spacing is ½ of the main lobe width and that is designed in this application. A subcarrier 1 and a subcarrier 8 each are a redundant subcarrier. Any subcarrier in the subcarrier 1 to the subcarrier 8 is non-orthogonal to one adjacent subcarrier that is on each of a left side and a right side of the subcarrier, and is orthogonal to another subcarrier. For example, a subcarrier 2 is non-orthogonal to the subcarrier 1 and a subcarrier 3. In other words, a main lobe peak point of the subcarrier 1 and the subcarrier 3 is not a zero point of the subcarrier 2. The subcarrier 2 is orthogonal to a subcarrier other than the subcarrier 1 and the subcarrier 3. In other words, a main lobe peak point of the another subcarrier is the zero point of the subcarrier 2.

The foregoing describes a frequency domain feature of the first signal, and the following describes a time domain feature of the first signal.

Optionally, in time domain, the first signal may include a time domain self-cyclic pulse signal that includes L time domain pulses and that has a length of βTL, T is a window length of the time domain pulse, βT is a pulse interval between adjacent time domain pulses, β is a compression rate between the time domain pulses, L is a positive integer, and β is a positive number.

In other words, the L time domain pulses overlap with each other. For example, the L time domain pulses may be added in a staggered manner based on β, and a tail of a last pulse is removed and is superimposed on a head of a $1^{st}$ pulse, to obtain the time domain self-cyclic pulse signal whose length is βTL.

Optionally, β is greater than or equal to 1/M, and is less than or equal to 1. In other words, 1/M≤=≤1. Usually, when the compression rate between the time domain pulses is equal to β, an $l_{th}$ time domain pulse interferes with $\lceil 1/\beta\rceil-1$ adjacent time domain pulses on each of a left side and a right side of the $l_{th}$ time domain pulse. Therefore, in this application, when a value of β is a minimum value 1/M, in the L time domain pulses, interference exists between an $l_{th}$ time domain pulse and each of M−1 adjacent time domain pulses that are located on each of a left side and a right side of the $l_{th}$ time domain pulse. In this case, time domain pulse density is highest. When the value of β is a maximum value 1, no interference exists between the L time domain pulses. In this case, it is equivalent to that the time domain pulses are orthogonal to each other. Herein, $l\in\{1, 2, \ldots, L\}$.

In other words, a smaller value of β indicates higher time domain pulse density, and correspondingly, indicates a larger quantity of non-orthogonal time domain pulses. In other words, the $l_{th}$ time domain pulse interferes with more adjacent time domain pulses of the $l_{th}$ time domain pulse. A larger value of β indicates lower time domain pulse density, and correspondingly, indicates a larger quantity of orthogonal time domain pulses and a smaller quantity of non-orthogonal time domain pulses. In an actual application, the value of β may be flexibly selected with reference to an actual situation.

In a possible implementation of this application, the value of β may be ½. In this case, the $l_{th}$ time domain pulse interferes with only one adjacent time domain pulse that is located on each of the left side and the right side of the $l_{th}$ time domain pulse, and is orthogonal to another time domain pulse. Therefore, when little interference exists between time domain pulses, density of time domain pulses is increased, to improve the spectrum efficiency and reduce out-of-band attenuation.

It can be understood that when a frequency domain redundant subcarrier is not considered, if the spectral efficiency of OFDM is 1, after density of time domain pulses is increased based on a time domain pulse density increase solution provided in this application, the theoretical spectral efficiency may be $1/\beta$.

Optionally, in time domain, the first signal may further include the time domain cyclic prefix. For example, a time domain cyclic prefix whose length is $T_{CP}$ may be added before the time domain self-cyclic pulse signal whose length is $\beta TL$, to finally form the time domain signal whose length is $T_{CP}+\beta TL$. Based on this solution, because the time domain cyclic prefix is added, the first signal can resist multipath interference.

It can be understood that when the frequency domain redundant subcarrier is not considered, if the spectral efficiency of OFDM is 1, after the time domain cyclic prefix is added based on the solution provided in this application, the spectral efficiency may be $\beta LT/(T_{CP}+\beta TL)$.

Figure 8:
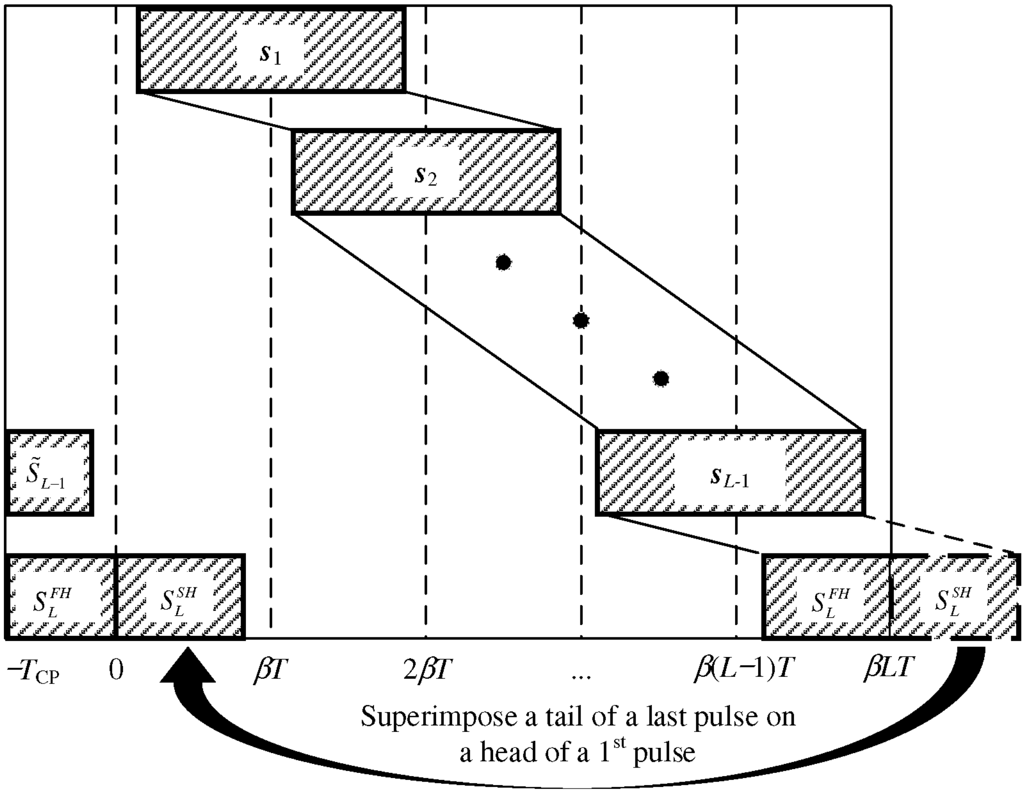
FIG. 8 is a schematic diagram of a structure in which time domain pulses are superimposed according to an embodiment of this application.

For example, $\beta$ is greater than ½. The foregoing provided time domain characteristic may be shown in FIG. 8. Herein, $S_l$ represents the $l_{th}$ time domain pulse. A tail $$S_L^{SH}$$

of a last time domain pulse is superimposed between 0 and $\beta T$. The time domain cyclic prefix is formed by copying a signal at the tail into the head. In other words, a time domain cyclic prefix between $-T_{CP}$ and 0 is a signal whose length is $T_{CP}$ and that is copied before $\beta LT$, and is represented by using $$S_L^{FH}$$

and $\tilde{S}_{L-1}$ in FIG. 8.

It should be noted that, in FIG. 8, for ease of understanding, $S_l$ is represented as a rectangle, and it does not mean that $S_l$ is a rectangular window. Actually, $S_l$ is the time domain pulse whose spectrum satisfies the M-order zero-crossing characteristic.

The foregoing describes the time domain feature and the frequency domain feature of the first signal in this application. Based on the foregoing features, the first signal in this application may be referred to as adjacent partial response signaling (APRS). Certainly, the first signal may further have another name. The name of the first signal is not specifically limited in this embodiment of this application.

In conclusion, the features of the first signal and spectral efficiency brought by each feature in this application may be shown in Table 1.

TABLE 1

| Signal feature | Spectral efficiency |
|---|---|
| A subcarrier spacing is 1/M of a main lobe width of a spectrum of a time domain pulse | M |
| Start M-1 subcarriers and last M-1 subcarriers are redundant subcarriers | K/(K + 2M − 2) |
| A time domain pulse interval is $\beta T$ | $1/\beta$ |
| A time domain cyclic prefix is added | $\beta LT / (T_{CP} + \beta TL)$ |

TABLE 1-continued

| Signal feature | Spectral efficiency |
|---|---|
| First signal | $KLTM/(K + 2M - 2)(T_{CP} + \beta TL)$ |

The following describes the symbol included in the first signal and content carried on the redundant subcarrier.

For the symbol included in the first signal:

In a possible implementation, the symbol included in the first signal may be a modulated symbol, for example, a quadrature amplitude modulation (QAM) symbol. A modulation scheme is not specifically limited in this application.

In another possible implementation, the symbol included in the first signal may be a symbol obtained after K-dimensional discrete Fourier transform spread is performed on a modulated symbol.

Based on this solution, discrete Fourier transform spread is introduced at a transmit end, to reduce a peak-to-average power ratio. In addition, a receive end does not need to perform discrete Fourier transform, to relatively reduce complexity of the receive end.

For the redundant subcarrier:

In a possible implementation, the start M−1 subcarriers in the K+2(M−1) subcarriers are used to carry a frequency domain cyclic prefix, and the last M−1 subcarriers are used to carry a frequency domain cyclic suffix. In other words, the redundant subcarrier is used to carry the frequency domain cyclic prefix/suffix.

Optionally, the frequency domain cyclic prefix carried on the start M−1 subcarriers may be a symbol carried on last M−1 valid subcarriers in the middle K valid subcarriers, and the frequency domain cyclic suffix carried on the last M−1 subcarriers may be a symbol carried on start M−1 valid subcarriers in the K valid subcarriers.

For example, when M is equal to 2, the frequency domain cyclic prefix $\bar{a}_{1,l}$ may be $\bar{a}_{1,l}=\bar{a}_{K+1,l}$, and the frequency domain cyclic suffix is $\bar{a}_{K+2,l}=\bar{a}_{2,l}$. Herein, $\bar{a}_{K+1,l}$ is a symbol carried on an $l_{th}$ time domain pulse of a last valid subcarrier in the K valid subcarriers, and $\bar{a}_{2,l}$ is a symbol carried on an $l_{th}$ time domain pulse of a $1^{st}$ valid subcarrier in the K valid subcarriers.

In another possible implementation, the start M−1 subcarriers and the last M−1 subcarriers in the K+2(M−1) subcarriers are padded with zero. In other words, the redundant subcarrier may carry no symbol.

Based on this solution, because the redundant subcarrier is padded with zero, transmit power of the 2(M−1) subcarriers can be reduced, to reduce interference of the redundant subcarrier to an adjacent subcarrier of the redundant subcarrier.

Based on the foregoing features, this application further provides a representation form of consecutive time complex baseband signals of the first signal. Details are as follows:

When the first signal does not include the time domain cyclic prefix, the first signal satisfies the following formula. In other words, a form of the first signal may be represented by using Formula 1:

$$s(t)=\begin{cases}\sum_{k=0}^{K+(2M-1)-1}\bar{a}_{k,1}g(t-\beta T)e^{j2\pi(k-1-K/2)(t-\beta T)/T}+ & 0\le t<\beta T\\ \sum_{k=0}^{K+(2M-1)-1}\bar{a}_{k,L}g(t)e^{j2\pi(k-1-K/2)t/T}, & \\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases}$$

When the first signal includes the time domain cyclic prefix, the first signal satisfies the following formula. In other words, a form of the first signal may be represented by using Formula 2:

$$s(t)=\begin{cases}\sum_{k=0}^{K+(2M-1)-1}\bar{a}_{k,L-1}g(t+\beta T)e^{j2\pi(k-1-K/2)(t+\beta T)/T}+ & -T_{CP}\le t<0\\ \sum_{k=0}^{K+(2M-1)-1}\bar{a}_{k,L}g(t)e^{j2\pi(k-1-K/2)t/T}, & \\ \sum_{k=0}^{K+(2M-1)-1}\bar{a}_{k,1}g(t-\beta T)e^{j2\pi(k-1-K/2)(t-\beta T)/T}+ & 0\le t<\beta T\\ \sum_{k=0}^{K+(2M-1)-1}\bar{a}_{k,L}g(t)e^{j2\pi(k-1-K/2)t/T}, & \\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases}$$

Herein, s(t) is the first signal, g(t) is the time domain pulse, $\bar{a}_{k,l}$ is a symbol carried on an $l_{th}$ time domain pulse of a $k_{th}$ subcarrier, $k\in\{0, 1, 2, \ldots, K+2(M-1)-1\}$, $l\in\{1, 2, \ldots, L\}$, and $T_{CP}$ is a length of the time domain cyclic prefix.

It can be understood that $\bar{a}_{k,l}$ may be a modulated symbol. In this case, $\bar{a}_{k,l}$ may alternatively be written as $\bar{a}_{k,l}$; or $\bar{a}_{k,l}$ may alternatively be a symbol obtained after K-dimensional discrete Fourier transform spread is performed on the modulated symbol. In this case, $\bar{a}_{k,l}$ may also be written as $\hat{a}_{k,l}$. In other words, in this application, the modulated symbol may be represented as $a_{k,l}$ and the symbol obtained after K-dimensional discrete Fourier transform spread is performed on the modulated symbol may be represented as $\hat{a}_{k,l}$.

Optionally, a range of a time t in the foregoing formula is in a left-closed and right-open form. Certainly, the range may alternatively be in a right-closed and left-open form or in a left-closed and right-closed form. This is not specifically limited in this embodiment of this application, provided that the first signal is time-continuous finally. For example, when the first signal includes the time domain cyclic prefix, $-T_{CP}\le t<0$ in the foregoing formula may be replaced with $-T_{CP}\le t<0$, and $0\le t<\beta T$ may be replaced with $0<t\le\le T$. That the range is closed indicates that a boundary value of the range may be obtained, and that the range is open indicates that a boundary value of the range cannot be obtained.

Figure 9:
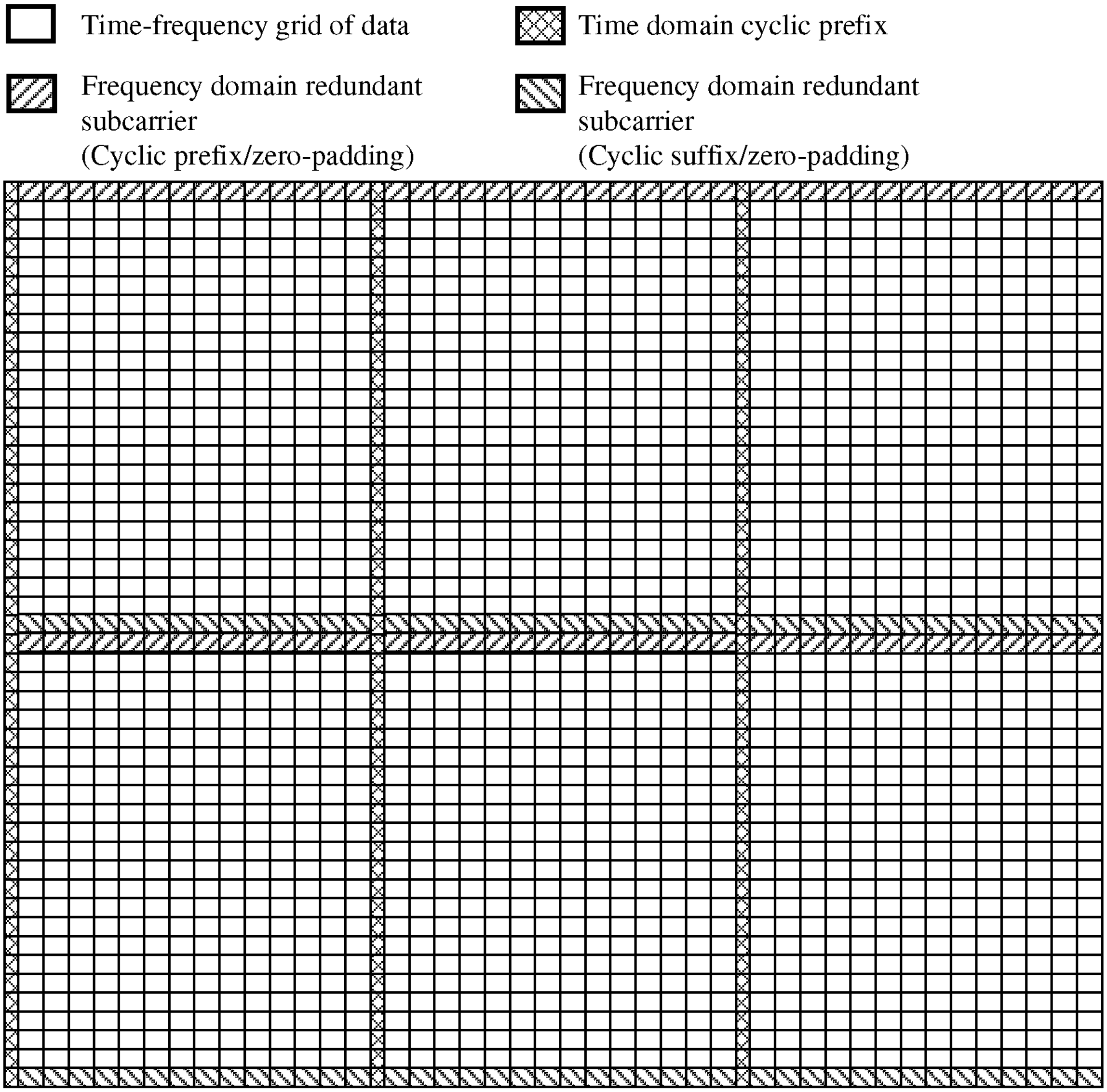
FIG. 9 is a schematic diagram of a structure of a time-frequency frame according to an embodiment of this application.

In conclusion, for example, M is equal to 2, and β is equal to ½. FIG. 9 is a schematic diagram of a structure of a time-frequency frame corresponding to a first signal. FIG. 9 shows six time-frequency frames. One redundant subcarrier is included before and after each time-frequency frame in frequency domain of the time-frequency frame, and the redundant subcarrier is used to carry a frequency domain cyclic prefix/suffix, or is padded with zero. A time domain cyclic prefix is included before the time-frequency frame in time domain.

It should be noted that, because frequency domain subcarriers overlap and time domain pulses overlap in this application, a width of a rectangle in FIG. 9 is obtained when a subcarrier corresponding to the rectangle and a subcarrier that interferes with the subcarrier overlap. Similarly, a length of the rectangle is obtained when a time domain pulse corresponding to the rectangle and a time domain pulse that interferes with the time domain pulse overlap.

Figure 10:
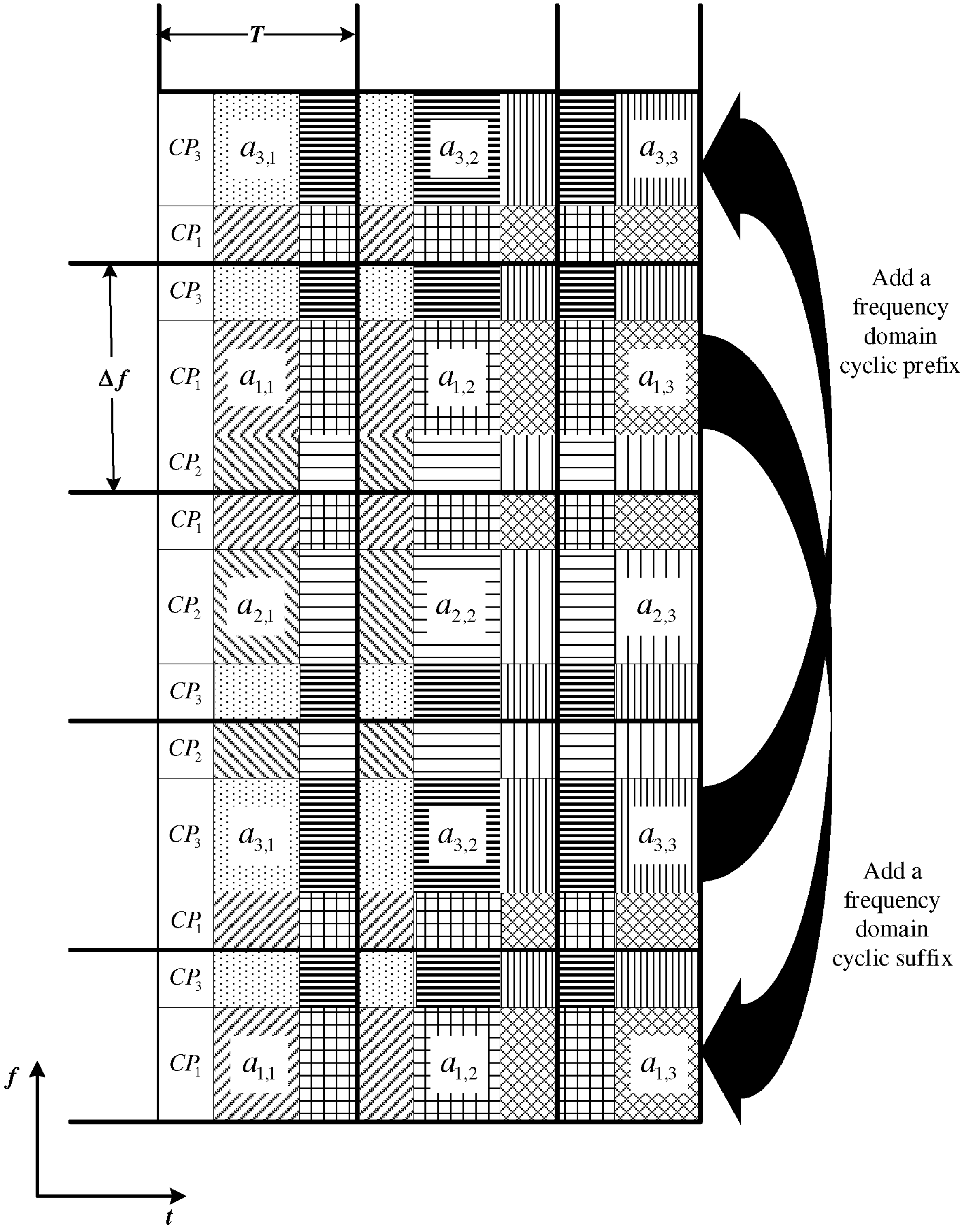
FIG. 10 is a schematic diagram of a time-frequency grid according to an embodiment of this application.

In addition, for example, it is assumed that L is equal to 3, K is equal to 3, M is equal to 2, and β is equal to ½. FIG. 10 is a schematic diagram of a time-frequency grid of a first signal. A same filling pattern represents a same symbol. Middle three subcarriers are valid subcarriers. A symbol $a_{1,l}$ carried on a 1st valid subcarrier in the three valid subcarriers is copied into a last redundant subcarrier and is used as a frequency domain cyclic suffix, and a symbol $a_{3,l}$ carried on a 3rd valid subcarrier is copied into a 1st redundant subcarrier and is used as a frequency domain cyclic prefix. In addition, it can be understood that a CP in FIG. 10 is a time domain cyclic prefix, and a symbol at a tail of a 3rd time domain pulse is superimposed on a symbol of a 1st time domain pulse. This process is not shown in FIG. 10.

Based on the example shown in FIG. 10, when β is equal to ½, a symbol carried on an $l_{th}$ time domain pulse of a $k_{th}$ subcarrier is interfered with by only symbols carried on adjacent subcarriers k−1 and k+1 and adjacent pulses l−1 and l+1. In other words, $\bar{a}_{k,l}$ is interfered with by $\bar{a}_{k-1,l-1}$, $\bar{a}_{k-1,l}$, $\bar{a}_{k-1,l+1}$, $\bar{a}_{k,l-1}$, $\bar{a}_{k,l+1}$, $\bar{a}_{k+1,l-1}$, $\bar{a}_{k+1,l}$, and $\bar{a}_{k+1,l+1}$. Herein, $\bar{a}_{2,2}$ is used as an example. In FIG. 10, a rectangle identified by $\bar{a}_{2,2}$ represents a symbol carried on a 2nd time domain pulse of a 2nd valid subcarrier. Eight rectangles around the rectangle are respectively interference from adjacent subcarriers of the 2nd valid subcarrier and adjacent pulses of the 2nd time domain pulse. From an upper left corner in a clockwise sequence, the eight rectangles are respectively interference of $a_{1,1}$, $a_{1,2}$, $a_{1,3}$, $a_{2,3}$, $a_{3,3}$, $a_{3,2}$, $a_{3,1}$, and $a_{2,1}$ to $\bar{a}_{2,2}$. An analysis of interference to another symbol is similar to an analysis of interference to $\bar{a}_{2,2}$. Details are not described herein again.

The following describes a baseband implementation solution of a first signal. Based on content carried on a redundant subcarrier and a type of a symbol included in the first signal, this application separately provides baseband implementation solutions of a transmitter and corresponding solutions of demodulation performed by a receiver in the following four scenarios:

(i) The redundant subcarrier carries a frequency domain cyclic prefix/suffix, and the symbol included in the first signal is a modulated symbol. In this case, the first signal may be referred to as cyclic prefix/suffix adjacent partial response signaling (CPS-APRS).

(ii) The redundant subcarrier carries a frequency domain cyclic prefix/suffix, and the symbol included in the first signal is a symbol obtained after K-dimensional discrete Fourier transform spread is performed on a modulated symbol. In this case, the first signal may be referred to as discrete Fourier transform spread cyclic prefix/suffix adjacent partial response signaling (DFT-s-CPS-APRS).

(iii) The redundant subcarrier is padded with zero, and the symbol included in the first signal is a modulated symbol. In this case, the first signal may be referred to as zero-padding adjacent partial response signaling (ZP-APRS).

(iv) The redundant subcarrier is padded with zero, and the symbol included in the first signal is a symbol obtained after K-dimensional discrete Fourier transform spread is performed on a modulated symbol. In this case, the first signal may be referred to as discrete Fourier transform spread zero-padding adjacent partial response signaling (DFT-s-ZP-APRS).

It can be understood that, in a baseband implementation, the foregoing described features of the first signal each are represented in a discrete form.

The following separately describes in detail baseband implementation solutions of the transmitter in the foregoing four scenarios by using an example in which M is equal to 2.

Figure 11A:
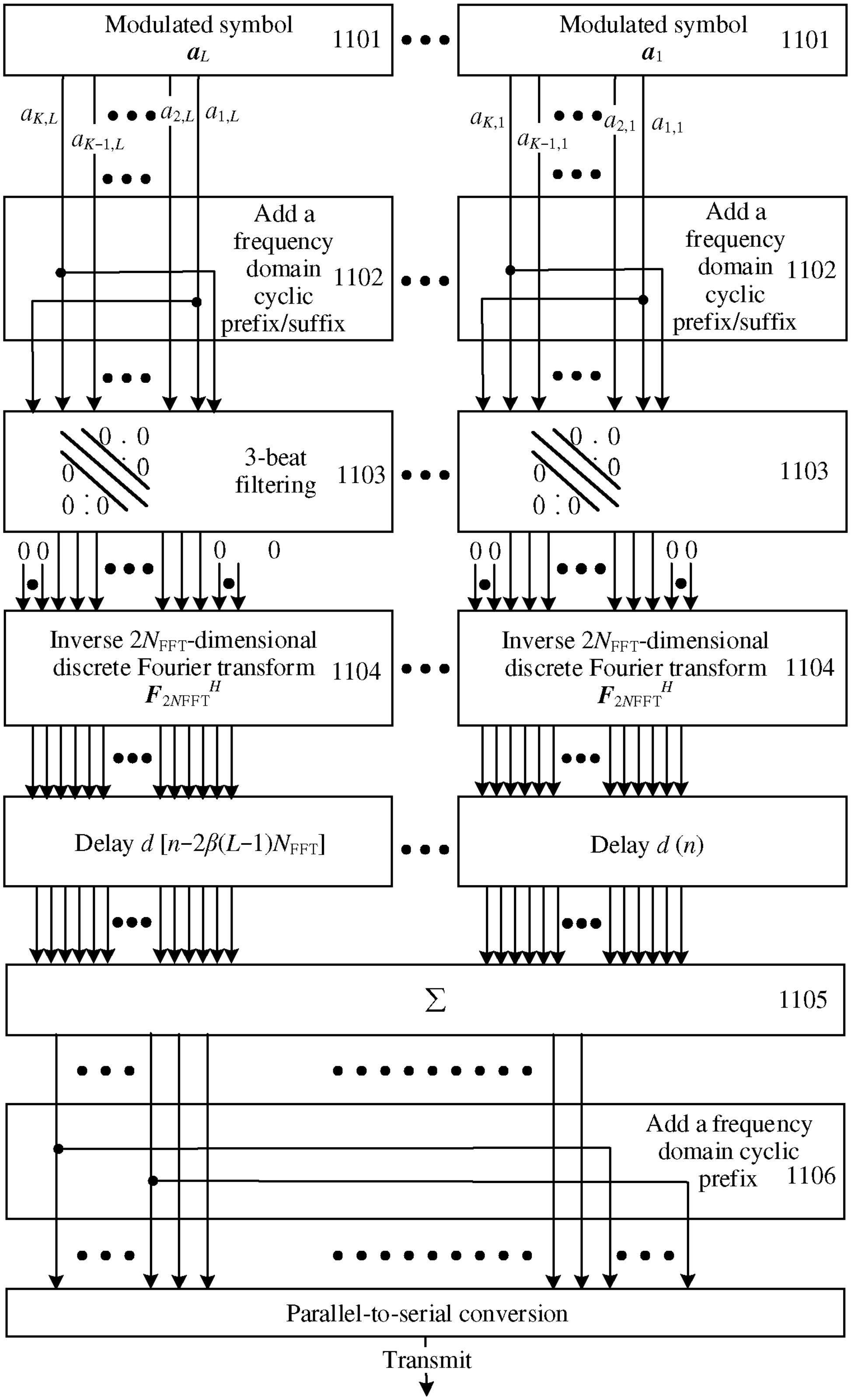
FIG. 11*a* is a block diagram 1 of a baseband implementation of a transmitter according to an embodiment of this application.

FIG. 11*a* is a block diagram of a baseband implementation of a transmitter in Scenario (i). Function, actions, or related descriptions of each module are as follows:

1101: A modulated symbol carried on an $l_{th}$ time domain pulse of a $k_{th}$ valid subcarrier may be represented as $a_{k,l}$, a modulated symbol carried on an $l_{th}$ time domain pulse may be represented as $a_l$, $a_l=[a_{1,l}, a_{2,l}, \ldots, a_{K,l}]^T$, and a matrix form a of modulated symbols carried on K valid subcarriers and L time domain pulses may be represented as:

$$a=[a_1, a_2, \ldots, a_L]=\begin{bmatrix} a_{1,1} & \cdots & a_{1,L} \\ \vdots & \ddots & \vdots \\ a_{K,1} & \cdots & a_{K,L} \end{bmatrix}$$

It should be noted that $k\in\{1, 2, \ldots, K\}$ and $l\in\{1, 2, \ldots, L\}$ herein.

In addition, a discrete time domain pulse g[n] of the time domain pulse and a frequency response G[k] of the discrete time domain pulse g[n] form a Fourier transform pair, namely, $$G[k]=\frac{2}{K}\sum_{n=-K/2}^{K/2-1} g[n]e^{-j\pi kn/K},\ k\in\{-K/2, -K/2+1, \ldots, K/2-1\}$$

Herein, $$g[n]=(1+\cos 2\pi n/K)/2$$

Correspondingly, $$G[k]=\begin{cases} 1, & k=0 \\ 1/2, & k=\pm 1 \\ 0, & \text{others} \end{cases}$$

It can be learned from a case in which subcarriers overlap and an expression of G[k] in this application that G[k] is a 3-beat frequency response.

1102: After (K+2)×K-dimensional matrix C used to add a frequency domain cyclic prefix and a frequency domain cyclic suffix is left-multiplied by a symbol matrix a, the frequency domain cyclic prefix is equal to $a_K$, and the frequency domain cyclic suffix is equal to $a_1$.

For example, the matrix C may be as follows:

$$C=\begin{bmatrix} 0 & 0_{1\times K-2} & 1 \\ 1 & 0_{1\times K-2} & 0 \\ 0_{K-2\times 1} & I_{K-2\times K-2} & 0_{K-2\times 1} \\ 0 & 0_{1\times K-2} & 1 \\ 1 & 0_{1\times K-2} & 0 \end{bmatrix}$$

Herein, 0 is a zero matrix, and subscripts respectively represent a row and a column. For example, $0_{K-2\times 1}$ represents a zero matrix with K−2 rows and one column. $I_{K-2\times K-2}$ is an identity matrix, and subscripts respectively represent a row and a column. For example, $I_{K-2\times K-2}$ represents a zero matrix with K−2 rows and K−2 columns.

1103: A (K+2)×(K+2)-dimensional 3-beat filter matrix G constructed by using the 3-beat frequency response G[k] is as follows:

$$G=\begin{bmatrix} G[0] & G[1] & 0 & 0_{1\times K-2} & 0 \\ G[-1] & G[0] & G[1] & 0_{1\times K-2} & 0 \\ 0 & G[-1] & G[0] & G[1] & 0_{1\times K-2} \\ \vdots & \ddots & \ddots & \ddots & \vdots \\ 0_{1\times K-2} & G[-1] & G[0] & G[1] & 0 \\ 0 & 0_{1\times K-2} & G[-1] & G[0] & G[1] \\ 0 & 0_{1\times K-2} & 0 & G[-1] & G[0] \end{bmatrix}$$

Herein, the 3-beat filter matrix G is a Toeplitz matrix. To be specific, elements on a primary diagonal are equal, elements on a line parallel to the primary diagonal are also equal, and the elements are symmetric about a secondary diagonal.

Interference between adjacent subcarriers and adjacent pulses can be simulated based on the 3-beat filter matrix G.

1104: Perform inverse $2N_{FFT}$-dimensional discrete Fourier transform on $a_l=[a_{1,l}, a_{2,l}, \ldots, a_{K,l}]^T$ through interpolation filtering, to obtain an upsampled time domain signal whose length is $2N_{FFT}$.

The process may be expressed as follows:

$$s_l=F_{2N_{FFT}}^H\begin{bmatrix} 0_{(2N_{FFT}-K-2)/2\times 1} \\ GCa_l \\ 0_{(2N_{FFT}-K-2)/2\times 1} \end{bmatrix}$$

Herein, $S_l$ is the upsampled time domain signal whose length is $2N_{FFT}$, $N_{FFT}$ is a point quantity (size) of inverse Fourier transform, $N_{FFT}$ is usually an integral power of 2, namely, $N_{FFT}=2^{\lceil \log_2(K+2)\rceil}$, and $F_{2N_{FFT}}$ represents a $2_{N_{FFT}}$-dimensional discrete Fourier transform matrix.

1105: Perform shift addition on upsampled time domain signals $S_1, S_2, \ldots, S_L$, to obtain a time domain signal t whose length is $2\beta LN_{FFT}$.

The process may be expressed as follows:

$$t=\begin{bmatrix} I_{N_{FFT}} & 0_{(2\beta-1)N_{FFT}\times 2N_{FFT}} & \cdots & 0_{(2\beta L-2\beta-1)N_{FFT}\times 2N_{FFT}} & 0_{(2\beta L-1)N_{FFT}\times 2N_{FFT}} \\ & I_{2N_{FFT}} & \ddots & I_{2N_{FFT}} & \\ 0_{(2\beta L-1)N_{FFT}\times 2N_{FFT}} & 0_{(2\beta L-2\beta-1)N_{FFT}\times 2N_{FFT}} & \cdots & 0_{(2\beta-1)N_{FFT}\times 2N_{FFT}} & I_{N_{FFT}} \end{bmatrix}\begin{bmatrix} s_1 \\ s_2 \\ \vdots \\ s_L \end{bmatrix}$$

The time domain signal t is a $2\beta LN_{FFT}\times 2LN_{FFT}$-dimensional matrix.

1106: After a time domain cyclic prefix whose length is $T_{CP}$ is added before the time domain signal t, a baseband time domain discretely transmitted signal X whose length is $2\beta LN_{FFT}+T_{CP}$ is finally obtained.

The process may be expressed as follows:

$$x=\begin{bmatrix} 0_{T_{CP}\times 2\beta LN_{FFT}\text{-}T_{CP}} & I_{T_{CP}} \\ I_{2\beta LN_{FFT}\text{-}T_{CP}} & 0_{2\beta LN_{FFT}\text{-}T_{CP}\times T_{CP}} \\ 0_{T_{CP}\times 2\beta LN_{FFT}\text{-}T_{CP}} & I_{T_{CP}} \end{bmatrix} t$$

It can be understood that the time domain discretely sent signal X may be obtained by sampling a time-continuous signal in Formula 2.

Therefore, a baseband time domain discretely transmitted signal with the foregoing features may be obtained. Then, after performing parallel-to-serial conversion, the transmitter sends a time-continuous signal. The time-continuous signal may be represented as Formula 2.

Figure 11B:
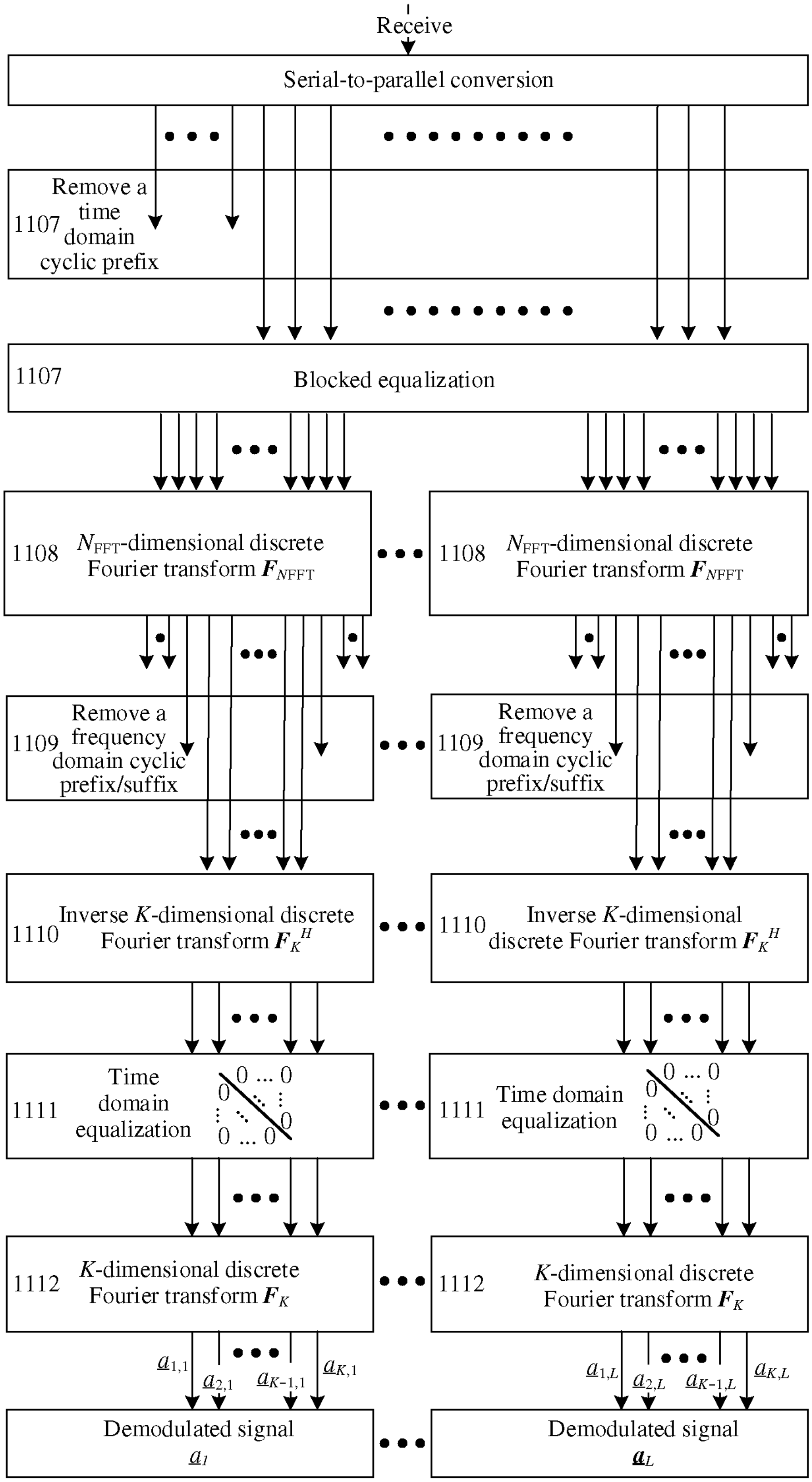
FIG. 11*b* is a block diagram 1 of demodulation performed by a receiver according to an embodiment of this application.

FIG. 11*b* is a block diagram of an implementation of demodulation performed by a receiver corresponding to FIG. 11*a*. Functions, actions, or related descriptions of modules are as follows:

1107: After receiving a first signal sent by a transmitter and performing serial-to-parallel conversion, a receiver removes a time domain cyclic prefix and performs blocked equalization, to obtain $N_{FFT}$ discrete time domain signals $\dot{r}_l$ for an $l_{th}$ time domain pulse.

Herein, $\dot{r}_l \triangleq [\dot{r}_{0,l}, \dot{r}_{1,l}, \ldots, \dot{r}_{N_{FFT}-1,l}]^T$.

Optionally, blocked equalization may be equalizing a multipath delay and interference between pulses based on a minimum mean square error.

1108: Perform $N_{FFT}$-dimensional discrete Fourier transform on the discrete time domain signal $\dot{r}_l$ of the $l_{th}$ time domain pulse, to obtain $N_{FFT}$ discrete frequency domain signals $\ddot{r}_l$.

Herein, $\ddot{r}_l \triangleq [\ddot{r}_{0,l}, \ddot{r}_{1,l}, \ldots, \ddot{r}_{N_{FFT}-1,l}]^T = F_{N_{FFT}}\dot{r}_l$, and $F_{N_{FFT}}$ represents an $N_{FFT}$-dimensional discrete Fourier transform matrix.

1109: The receiver may extract frequency domain signals $\ddot{a}_l$ on middle K valid subcarriers in K+2(M−1) subcarriers from the $N_{FFT}$ discrete frequency domain signals $\ddot{r}_l$, to remove a frequency domain cyclic prefix and a frequency domain cyclic suffix.

Herein, $\ddot{a}_l \triangleq [\ddot{a}_{1,l}, \ddot{a}_{2,l}, \ldots, \ddot{a}_{K,l}] = B\ddot{r}_l$.

Herein, B is a $K\times N_{FFT}$-dimensional subcarrier extraction matrix, and $B=[0_{(N_{FFT}-K)/2\times K}\ I_K\ 0_{(N_{FFT}-K)/2\times K}]^T$, to obtain the following formula:

$$\ddot{a}_l = \left[\ddot{r}_{(N_{FFT}-K)/2,l}, \ddot{r}_{(N_{FFT}-K)/2+1,l}, \ldots, \ddot{r}_{(N_{FFT}-K)/2-1,l}\right]^T$$

1110: Perform inverse K-dimensional inverse discrete Fourier transform on the frequency domain signal $\ddot{a}_l$ to obtain K discrete time domain signals $\dot{a}_l$.

Herein, $$\dot{a}_l \triangleq [\dot{a}_{1,l}, \dot{a}_{2,l}, \ldots, \dot{a}_{K,l}]^T = F_K^H\ddot{a}_l,,$$

and $F_K$ is a K-dimensional discrete Fourier transform matrix.

1111: Perform time domain equalization on the K discrete time domain signals $\dot{a}_l$, to obtain K discrete time domain signals $\hat{a}_l$.

Herein, $\hat{a}_l \triangleq [\hat{a}_{1,l}, \hat{a}_{2,l}, \ldots, \hat{a}_{K,l}]^T = \Lambda\dot{a}_l$. Λ may be referred to as a Doppler equalizer, and is a K-dimensional diagonal matrix $\Lambda=\mathrm{diag}\{\lambda_1, \lambda_2, \ldots, \lambda_K\}$, and $\lambda_1, \lambda_2, \ldots, \lambda_K$ are equalizer coefficients.

1112: Perform K-dimensional discrete Fourier transform on the K discrete time domain signals $\hat{a}_l$, to obtain K discrete frequency domain signals $\underline{a}_l$.

Herein, $\underline{a}_l \triangleq [\underline{a}_{1,l}, \underline{a}_{2,l}, \ldots, \underline{a}_{K,l}]^T = F_K\hat{a}_l$.

Herein, $\underline{a}_l$ is a demodulated symbol finally obtained by the receiver through demodulation. Therefore, according to the method, the receiver may demodulate the first signal, to obtain a demodulated symbol corresponding to a symbol included in the first signal, namely, $\underline{a}_l$.

In the foregoing solution, the transmitter respectively introduces the frequency domain cyclic prefix and the frequency domain cyclic suffix at two ends of a frequency band, and after filtering is performed by using a 3-beat spectrum response Toeplitz matrix G, a signal is transmitted to the receiver through a channel. After extracting the middle K valid subcarriers, the receiver may convert a signal transmission process from linear convolution to circular convolution. A circulant matrix $\tilde{G}$ corresponding to circular convolution may be diagonalized by using the K-dimensional discrete Fourier transform matrix. In other words, $$\tilde{G} = F_k g F_K^H.$$

Herein, g is a K-dimensional diagonal matrix, and elements on a primary diagonal of the K-dimensional diagonal matrix are as follows:

$$g[-K/2], g[-K/2+1], \ldots, g[-K/2+1]$$

The elements on the primary diagonal may be obtained by performing inverse discrete Fourier transform on G[−K/2], G[−K/2+1], . . . , G[K/2+1].

Finally, the circulant matrix $\tilde{G}$ may be expressed as follows:

$$\tilde{G}=\begin{bmatrix} G[0] & G[1] & 0 & 0_{1\times K-4} & G[-1] \\ G[-1] & G[0] & G[1] & 0_{1\times K-4} & 0 \\ 0 & G[-1] & G[0] & G[1] & 0_{1\times K-4} \\ \vdots & \ddots & \ddots & \ddots & \vdots \\ 0_{1\times K-4} & G[-1] & G[0] & G[1] & 0 \\ 0 & 0_{1\times K-4} & G[-1] & G[0] & G[1] \\ G[1] & 0_{1\times K-4} & 0 & G[-1] & G[0] \end{bmatrix}$$

Based on the foregoing solution, because linear convolution may be converted into circular convolution, in a demodulation process, after the middle K valid subcarriers are extracted, the demodulated symbol may be obtained by performing inverse discrete Fourier transform, time domain equalization, and discrete Fourier transform, to reduce demodulation complexity of the receiver. In addition, the transmitter does not need to perform discrete Fourier transform spread, and a structure is simple.

Figure 12A:
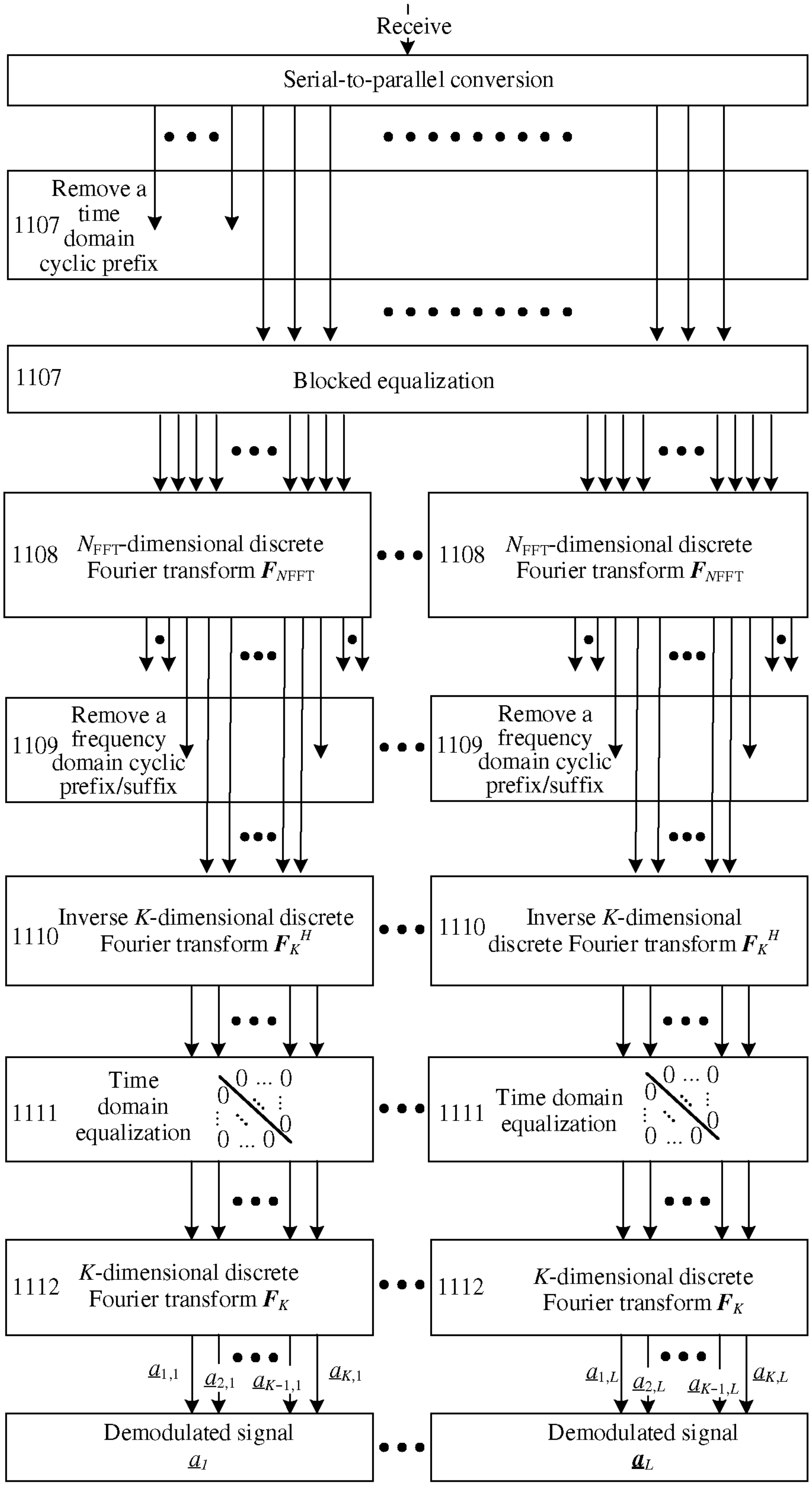
FIG. 12*a* is a block diagram 2 of a baseband implementation of a transmitter according to an embodiment of this application.

FIG. 12*a* is a block diagram of a baseband implementation of a transmitter in Scenario (ii). Function, actions, or related descriptions of each module are as follows:

1201 is the same as 1101. Reference may be made to related descriptions in 1101. Details are not described herein again.

1202: Perform K-dimensional discrete Fourier transform on the modulated symbol a, to obtain a symbol $\hat{a}$ obtained after K-dimensional discrete Fourier transform spread is performed on the modulated signal.

Herein, $\hat{a} \triangleq [\hat{a}_1, \hat{a}_2, \ldots, \hat{a}_L] = F_K a$.

1203 and 1204 are respectively the same as 1102 and 1103. Reference may be made to related descriptions in 1102 and 1103. Details are not described herein again.

1205: Perform inverse $2N_{FFT}$-dimensional discrete Fourier transform on $\hat{a}_l = [\hat{a}_{1,l}, \hat{a}_{2,l}, \ldots, \hat{a}_{K,l}]^T$ through interpolation filtering, to obtain an upsampled time domain signal whose length is $2N_{FFT}$.

The process may be expressed as follows:

$$s_l = F_{2N_{FFT}}^H \begin{bmatrix} 0_{(2N_{FFT}-K-2)/2\times 1} \\ GC\hat{a}_l \\ 0_{(2N_{FFT}-K-2)/2\times 1} \end{bmatrix}$$

Herein, $S_l$ is the upsampled time domain signal whose length is $2N_{FFT}$, $N_{FFT}$ is a point quantity (size) of inverse Fourier transform, $N_{FFT}$ is usually an integral power of 2, namely, $N_{FFT}=2^{\lceil log_2(K+2)\rceil}$, and $F_{2N_{FFT}}$ represents a $2_{N_{FFT}}$-dimensional discrete Fourier transform matrix.

1206 and 1207 are respectively the same as 1105 and 1106. Reference may be made to related descriptions in 1105 and 1106. Details are not described herein again.

Therefore, a baseband time domain discretely transmitted signal with the foregoing features may be obtained. Then, after performing parallel-to-serial conversion, the transmitter sends a time-continuous signal. The time-continuous signal may be represented as Formula 2.

Figure 12B:
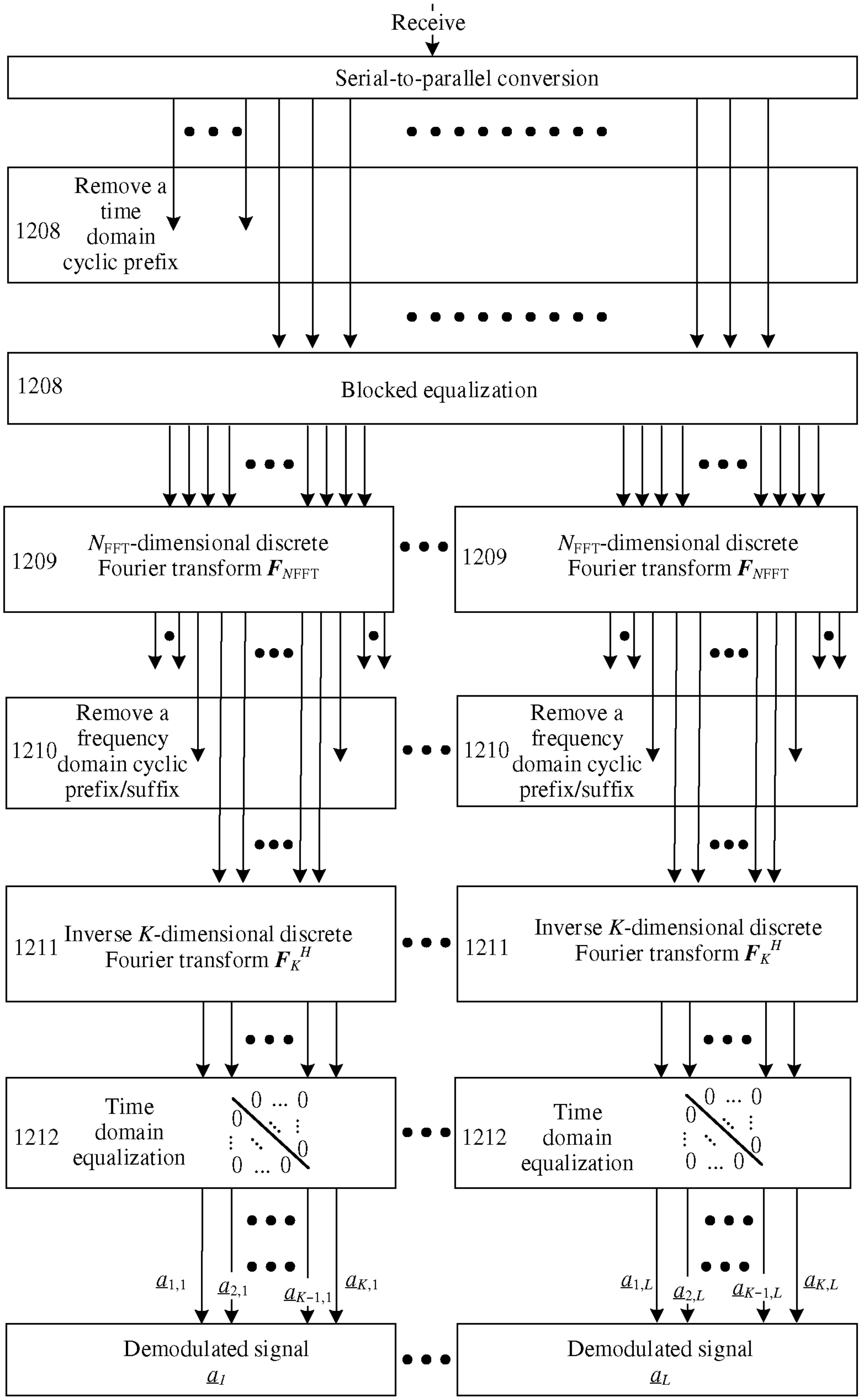
FIG. 12*b* is a block diagram 2 of demodulation performed by a receiver according to an embodiment of this application.

FIG. 12*b* is a block diagram of an implementation of demodulation performed by a receiver corresponding to FIG. 12*a*. 1208 to 1212 are respectively the same as 1107 to 1111. Reference may be made to related descriptions in 1107 to 1111. Details are not described herein again.

For a technical effect achieved in this scenario, refer to that in Scenario (i). In addition, in this scenario, after time domain equalization, the receiver does not need to perform K-dimensional discrete Fourier transform, and a structure is simple.

Figure 13A:
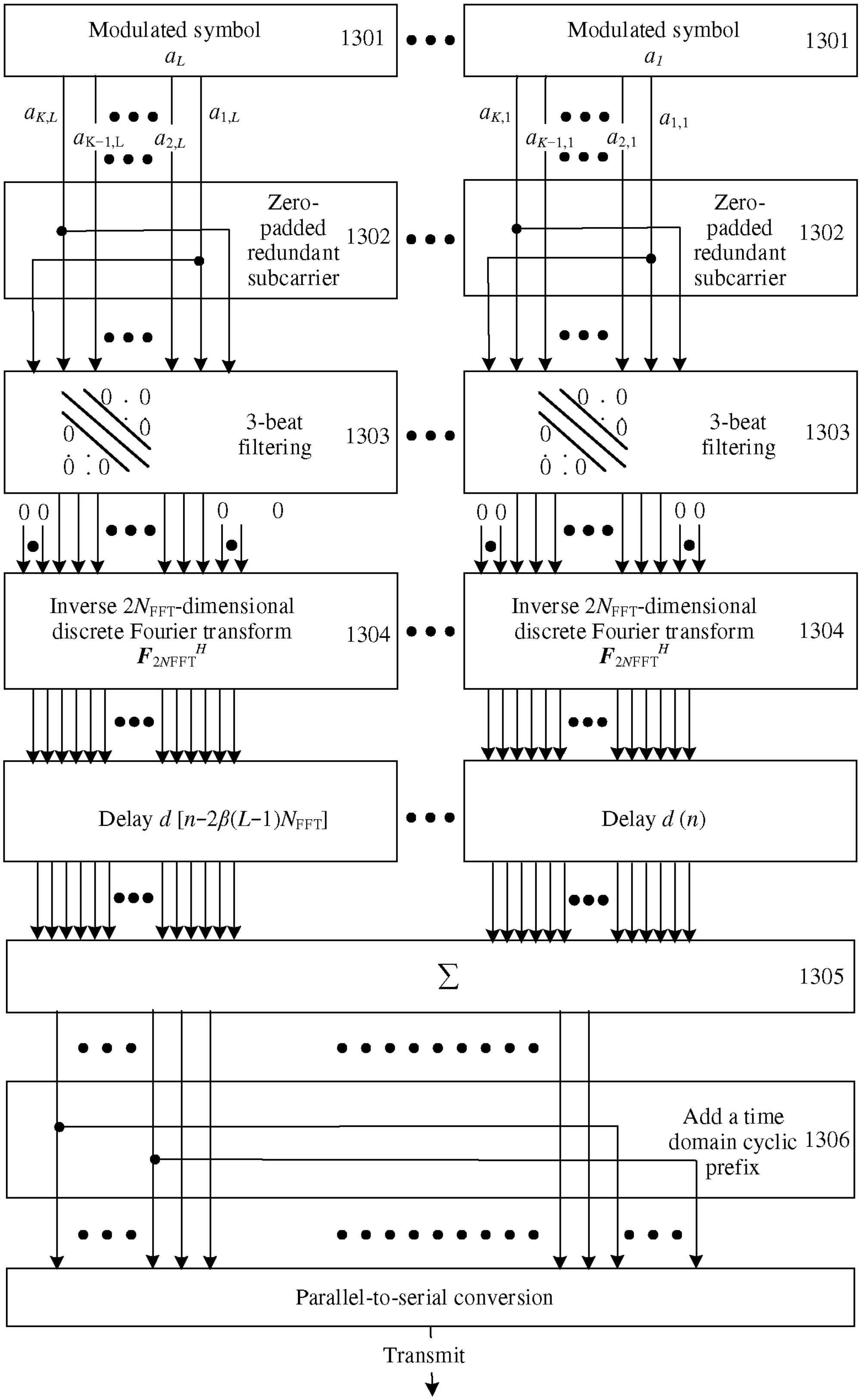
FIG. 13*a* is a block diagram 3 of a baseband implementation of a transmitter according to an embodiment of this application.

FIG. 13*a* is a block diagram of a baseband implementation of a transmitter in Scenario (iii). Function, actions, or related descriptions of each module are as follows:

1301 is the same as 1101. Reference may be made to related descriptions in 1101. Details are not described herein again.

1302: After a (K+2)×K-dimensional matrix Z used to fill a redundant subcarrier is left-multiplied by a symbol matrix a, the redundant subcarrier is filled with zero.

For example, the matrix Z may be as follows:

$$Z = \begin{bmatrix} 0 & 0_{1\times K\text{-}2} & 0 \\ 1 & 0_{1\times K\text{-}2} & 0 \\ 0_{K\text{-}2\times 1} & I_{K\text{-}2\times K\text{-}2} & 0_{K\text{-}2\times 1} \\ 0 & 0_{1\times K\text{-}2} & 1 \\ 0 & 0_{1\times K\text{-}2} & 0 \end{bmatrix}$$

1303 is the same as 1103. Reference may be made to related descriptions in 1103. Details are not described herein again.

1304: Perform inverse $2N_{FFT}$-dimensional discrete Fourier transform on $a_l=[a_{1,l}, a_{2,l}, \ldots, a_{K,l}]^T$ through interpolation filtering, to obtain an upsampled time domain signal whose length is $2N_{FFT}$.

The process may be expressed as follows:

$$s_l = F_{2N_{FFT}}^H \begin{bmatrix} 0_{(2N_{FFT}-K-2)/2\times 1} \\ GZa_l \\ 0_{(2N_{FFT}-K-2)/2\times 1} \end{bmatrix}$$

1305 and 1306 are the same as 1105 and 1106. Reference may be made to related descriptions in 1105 and 1106. Details are not described herein again.

Therefore, a baseband time domain discretely transmitted signal with the foregoing features may be obtained. Then, after performing parallel-to-serial conversion, the transmitter sends a time-continuous signal. The time-continuous signal may be represented as Formula 2.

Figure 13B:
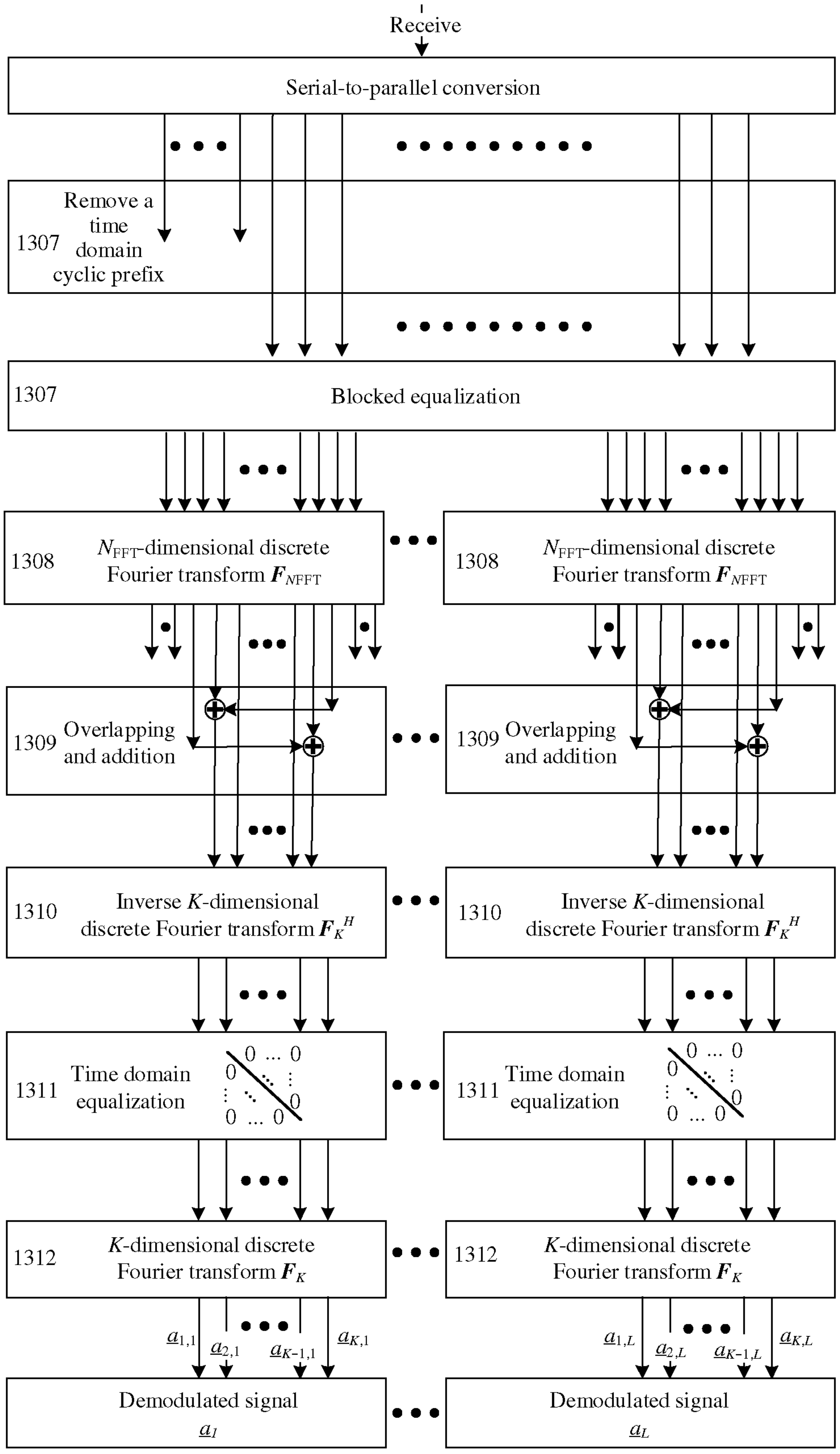
FIG. 13*b* is a block diagram 3 of demodulation performed by a receiver according to an embodiment of this application.

FIG. 13*b* is a block diagram of an implementation of demodulation performed by a receiver corresponding to FIG. 13*a*. Functions, actions, or related descriptions of modules are as follows:

1307 and 1308 are the same as 1107 and 1108. Reference may be made to related descriptions in 1107 and 1108. Details are not described herein again.

1309: The receiver may extract frequency domain signals on K+2(M−1) subcarriers from $N_{FFT}$ discrete frequency domain signals $\ddot{r}_l$, and then perform overlapping and addition, to obtain a K-dimensional frequency domain signal $\ddot{a}_l$.

Herein, $\ddot{a}_l \triangleq [\ddot{a}_{1,l}, \ddot{a}_{2,l}, \ldots, \ddot{a}_{K,l}]^T = C^T D \ddot{r}_l$.

Herein, $C^T$ is an overlap-add matrix, and is a transposed matrix of the matrix C in 1102. Herein, D is a $(K+2)\times N_{FFT}$-dimensional subcarrier extraction matrix, and $D=[0_{(N_{FFT}-K-2)/2\times K}\ I_{K+2}\ 0_{(N_{FFT}-K-2)/2\times K}]^T$, to obtain the following formula:

$$\ddot{a}_l = \left[\ddot{r}_{(N_{FFT}-K)/2,l} + \ddot{r}_{(N_{FFT}+K)/2,l}, \ddot{r}_{(N_{FFT}-K)/2+1,l}, \ldots, \ddot{r}_{(N_{FFT}+K)/2-1,l} + \ddot{r}_{(N_{FFT}-K)/2-1,l}\right]^T$$

1310 and 1312 are the same as 1110 and 1112. Reference may be made to related descriptions in 1110 and 1112. Details are not described herein again.

Herein, $\underline{a}_l$ is a demodulated symbol finally obtained by the receiver through demodulation. Therefore, according to the method, the receiver may demodulate the first signal, to obtain a demodulated symbol corresponding to a symbol included in the first signal, namely, $\underline{a}_l$.

For a technical effect achieved in this scenario, refer to that in Scenario (i). In addition, in this scenario, because the redundant subcarrier is padded with zero, transmit power of the redundant subcarrier can be reduced, to reduce interference of the redundant subcarrier to an adjacent subcarrier of the redundant subcarrier.

Figure 14A:
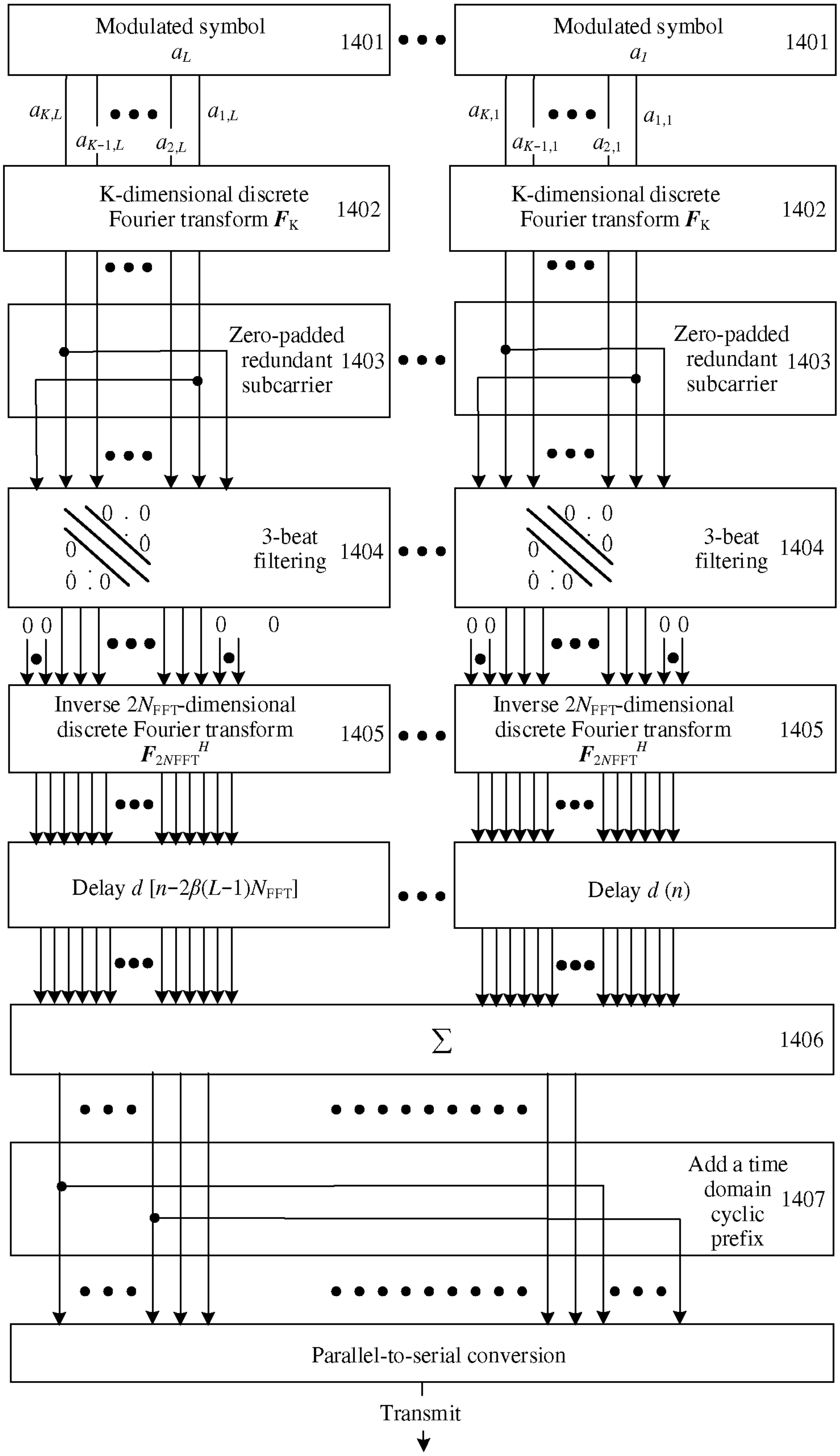
FIG. 14*a* is a block diagram 4 of a baseband implementation of a transmitter according to an embodiment of this application.

FIG. 14*a* is a block diagram of a baseband implementation of a transmitter in Scenario (iv). Function, actions, or related descriptions of each module are as follows:

1401 is the same as 1101. Reference may be made to related descriptions in 1101. Details are not described herein again.

1402: Perform K-dimensional discrete Fourier transform on the modulated symbol a, to obtain a symbol $\hat{a}$ obtained after K-dimensional discrete Fourier transform spread is performed on the modulated signal.

Herein, $\hat{a} \triangleq [\hat{a}_1, \hat{a}_2, \ldots, \hat{a}_L] = F_K a$.

1403 is the same as 1302. Reference may be made to related descriptions in 1302. Details are not described herein again.

1404 is the same as 1103. Reference may be made to related descriptions in 1103. Details are not described herein again.

1405: Perform inverse $2N_{FFT}$-dimensional discrete Fourier transform on $\hat{a}_l = [\hat{a}_{1,l}, \hat{a}_{2,l}, \ldots, \hat{a}_{K,l}]^T$ through interpolation filtering, to obtain an upsampled time domain signal whose length is $2N_{FFT}$.

The process may be expressed as follows:

$$s_l = F_{2N_{FFT}}^H \begin{bmatrix} 0_{(2N_{FFT}-K-2)/2\times 1} \\ GZ\hat{a}_l \\ 0_{(2N_{FFT}-K-2)/2\times 1} \end{bmatrix}$$

1406 and 1407 are respectively the same as 1105 and 1106. Reference may be made to related descriptions in 1105 and 1106. Details are not described herein again.

Therefore, a baseband time domain discretely transmitted signal with the foregoing features may be obtained. Then, after performing parallel-to-serial conversion, the transmitter sends a time-continuous signal. The time-continuous signal may be represented as Formula 2.

Figure 14B:
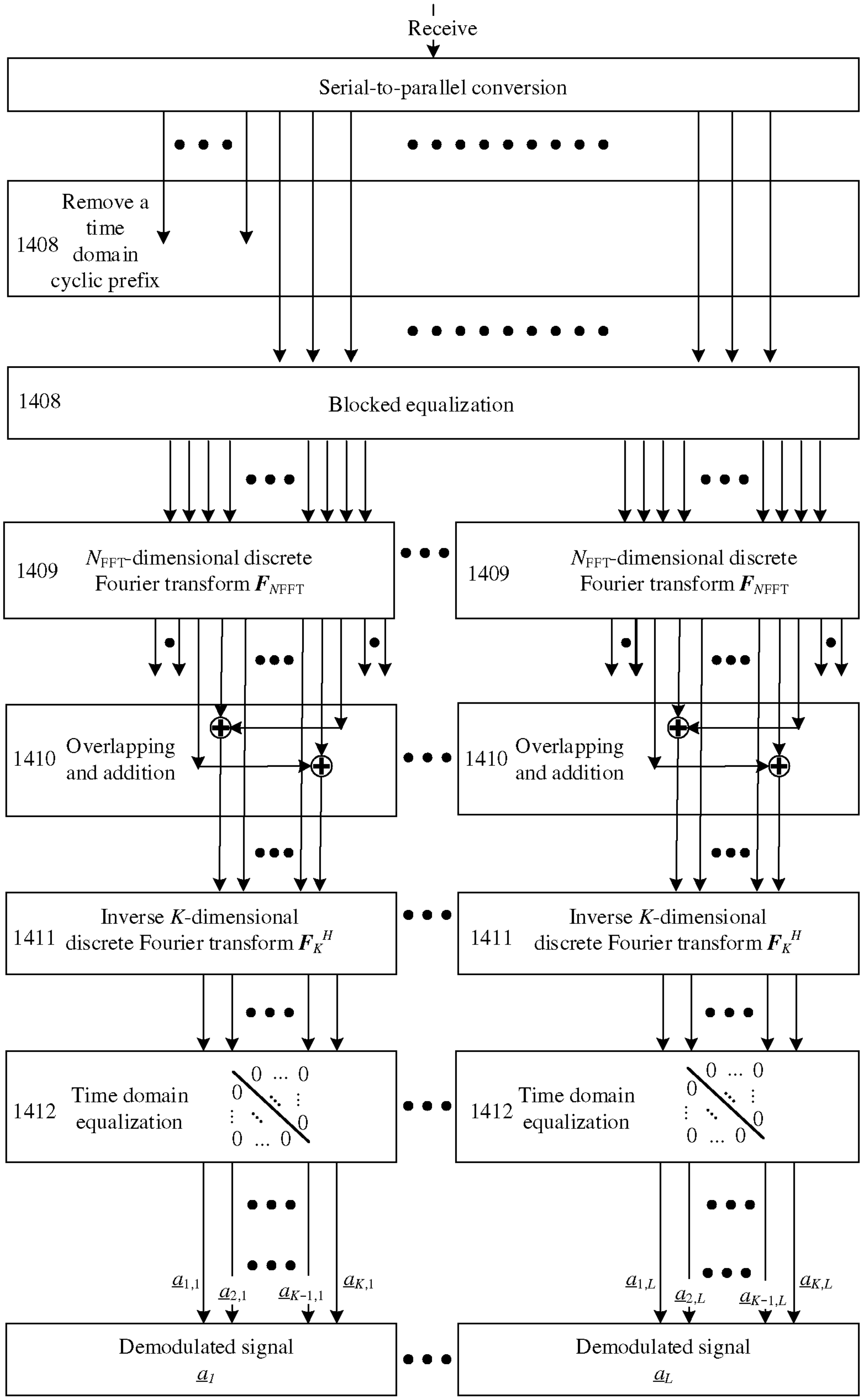
FIG. 14*b* is a block diagram 4 of demodulation performed by a receiver according to an embodiment of this application.

FIG. 14*b* is a block diagram of an implementation of demodulation performed by a receiver corresponding to FIG. 14*a*. 1408 to 1412 are respectively the same as 1307 to 1311. Reference may be made to related descriptions in 1307 to 1311. Details are not described herein again.

For a technical effect achieved in this scenario, refer to that in Scenario (i). In addition, in this scenario, after time domain equalization, the receiver does not need to perform K-dimensional discrete Fourier transform, and a structure is simple. In addition, because the redundant subcarrier is padded with zero, transmit power of the redundant subcarrier can be reduced, to reduce interference of the redundant subcarrier to an adjacent subcarrier of the redundant subcarrier.

It can be understood that the transmitter may be a first communication apparatus or an apparatus included in the first communication apparatus, and the receiver may be a second communication apparatus or an apparatus included in the second communication apparatus.

In the foregoing embodiments, actions of the first communication apparatus or the second communication apparatus may be performed by the processor 301 in the communication apparatus 300 in FIG. 3 by invoking application program code stored in the memory 303, to indicate the communication apparatus to perform the actions. This is not limited in this embodiment.

The following describes, with reference to a simulation result, a peak-to-average power ratio, out-of-band leakage, a block error rate, and spectral efficiency of APRS (namely, a first signal) provided in this embodiment of this application.

It should be noted that the APRS is CPS-APRS. To be specific, a redundant subcarrier is used to carry a frequency domain cyclic prefix/suffix. In other words, the APRS represents CPS-APRS, and DFT-s-APRS represents DFT-s-CPS-APRS.

Figure 15:
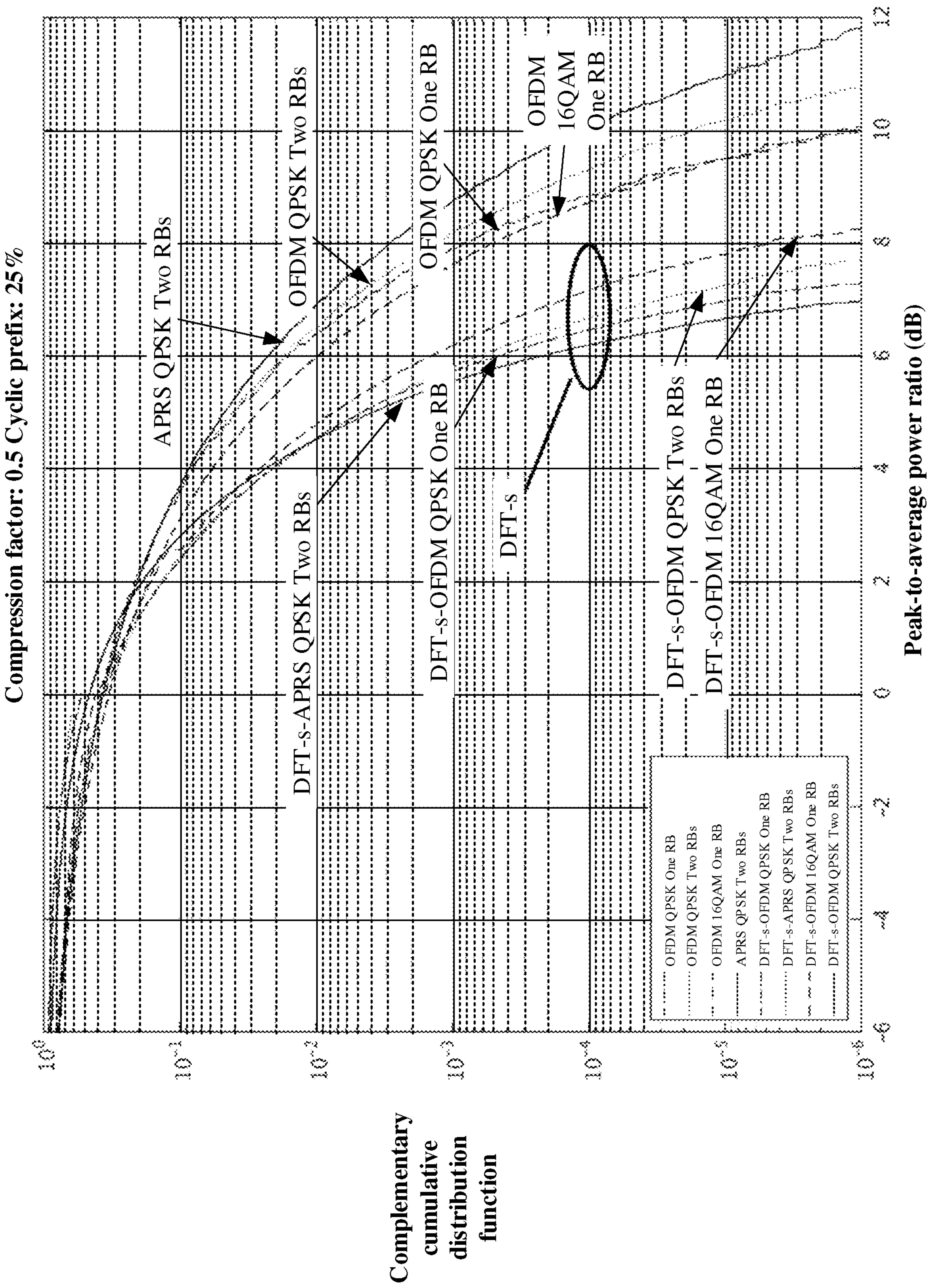
FIG. 15 is a schematic diagram of a peak-to-average power ratio according to an embodiment of this application.

FIG. 15 is a schematic diagram of a simulation of a peak-to-average power ratio of APRS and a peak-to-average power ratio of OFDM when β is equal to ½ and a length of a time domain cyclic prefix is 25%. QPSK is a modulation scheme, and represents quadrature phase shift keying (QPSK) modulation, an RB is a resource block (RB), and one RB represents 12 subcarriers.

It can be learned from FIG. 15 that the peak-to-average power ratio of the APRS is 0.8 dB to 1.2 dB higher than the peak-to-average power ratio of OFDM, and a peak-to-average power ratio of DFT-s-APRS is 0.3 dB to 1 dB lower than a peak-to-average power ratio of a DFT-s-OFDM.

Figure 16:
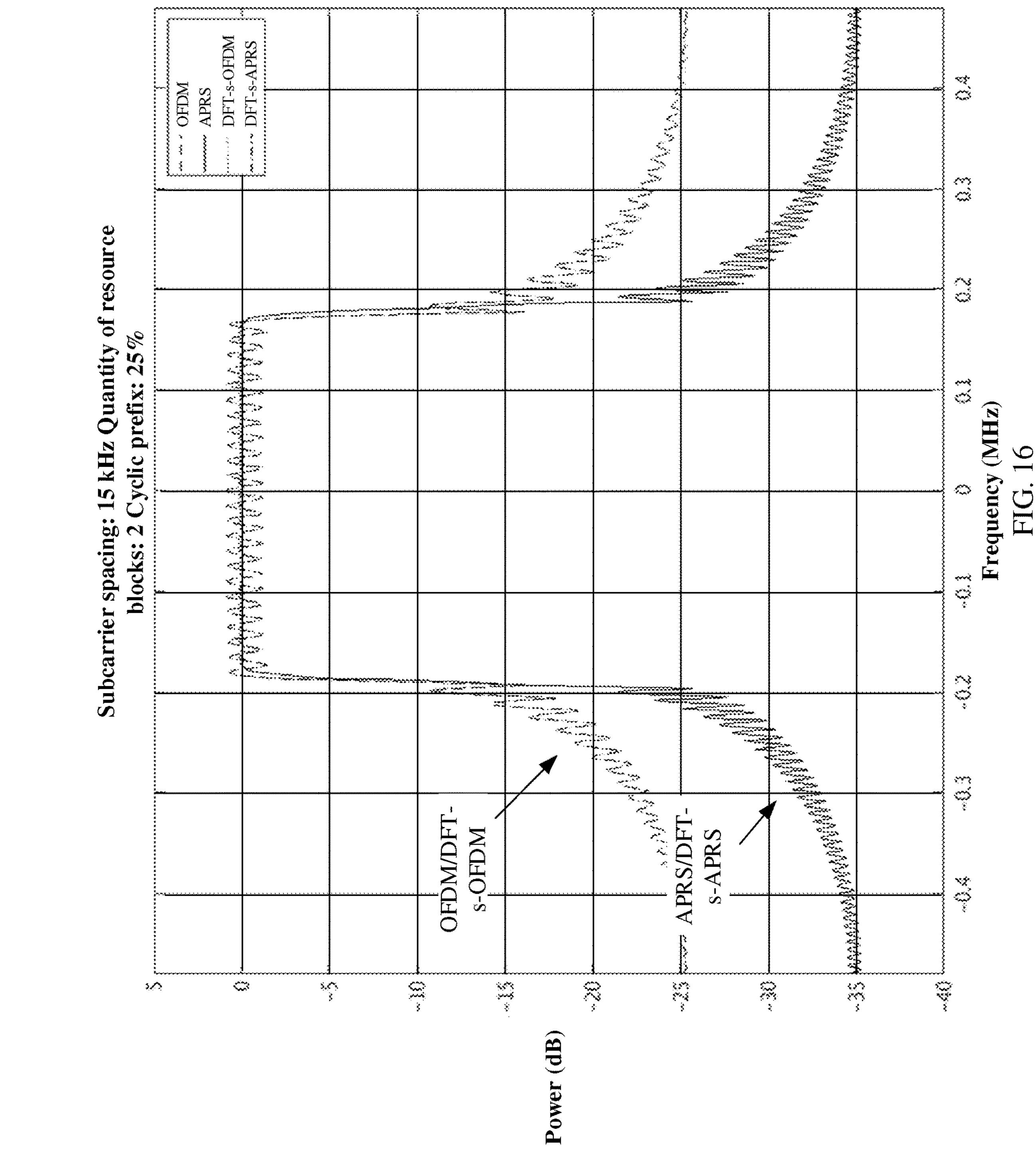
FIG. 16 is a schematic diagram of out-of-band leakage according to an embodiment of this application.

FIG. 16 is a schematic diagram of a simulation of out-of-band leakage of APRS and out-of-band leakage of OFDM when a subcarrier spacing is 15 kHz, a quantity of resource blocks is 2, and a length of a time domain cyclic prefix is 25%. In FIG. 16, a curve of OFDM and a curve of DFT-s-OFDM overlap, and a curve of APRS and a curve of DFT-s-APRS overlap. In other words, OFDM and DFT-s-OFDM have same out-of-band leakage, and out-of-band attenuation is −25 dB. The APRS and the DFT-s-APRS have same out-of-band leakage, and out-of-band attenuation is −35 dB. Therefore, the APRS/DFT-s-OFDM is 10 dB lower than OFDM/DFT-s-OFDM.

Figure 17:
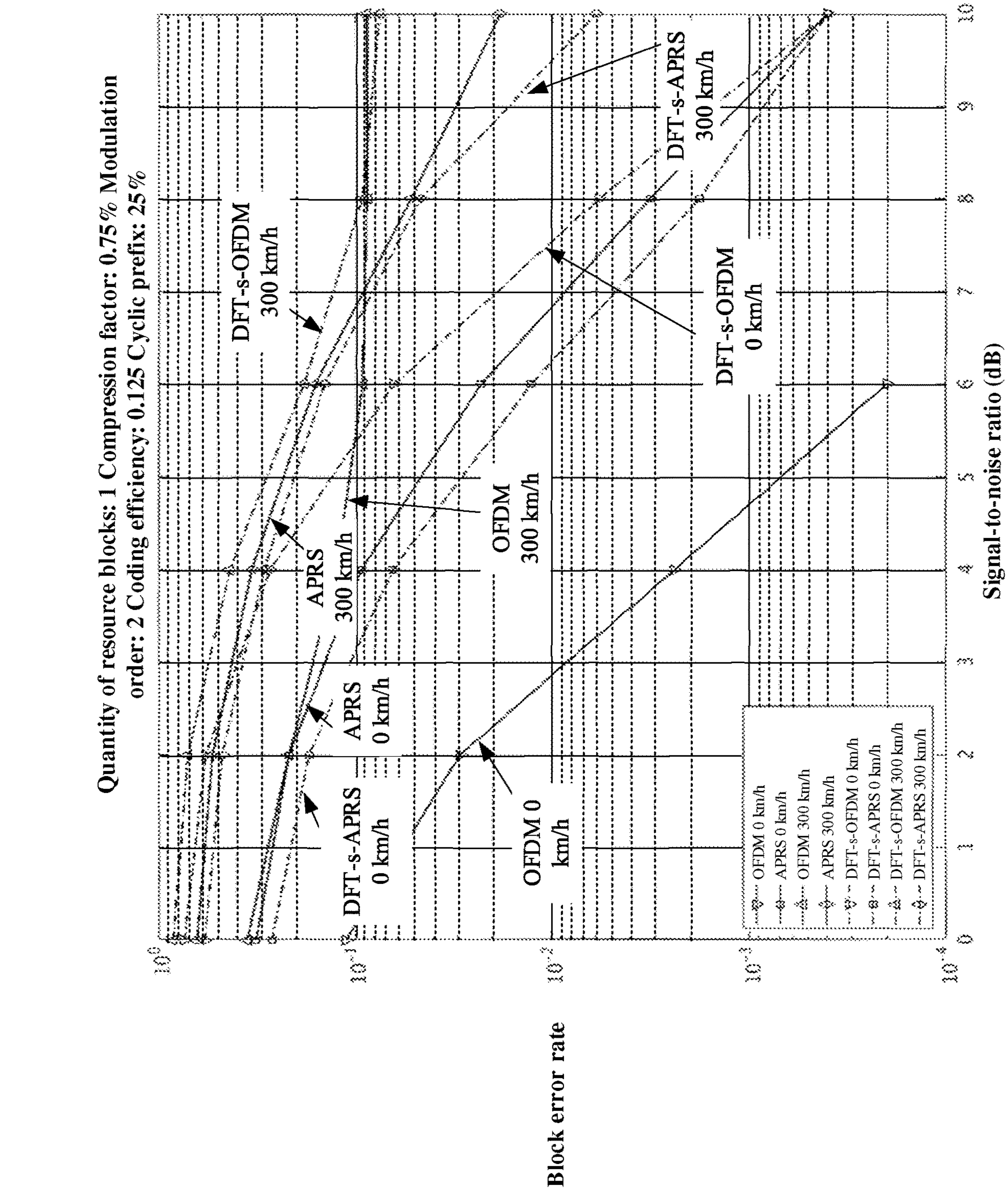
FIG. 17 is a schematic diagram of a block error rate according to an embodiment of this application.

FIG. 17 is a schematic diagram of a simulation of a block error rate of a first signal and a block error rate of OFDM when a quantity of resource blocks is equal to 1, β is equal to 0.75, a modulation order is 2, coding efficiency is 0.125, and a length of a time domain cyclic prefix is 25%. It can be learned from FIG. 17 that in a high-speed movement scenario, redundant subcarriers at two ends of a frequency band are used for DFT-s-APRS, to reduce a block error rate.

Figure 18:
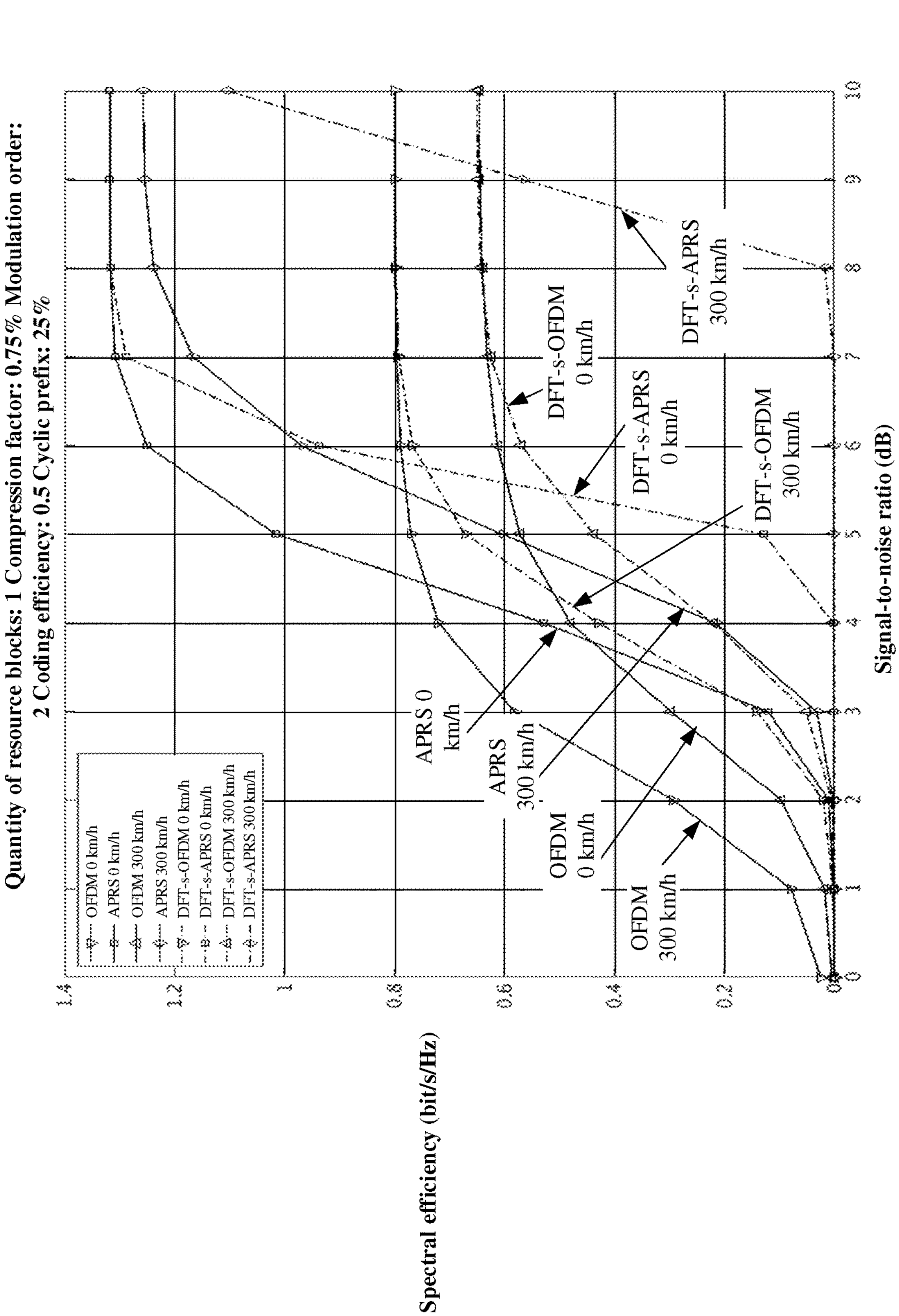
FIG. 18 is a schematic diagram of spectral efficiency according to an embodiment of this application.

FIG. 18 is a schematic diagram of a simulation of spectral efficiency of a first signal and spectral efficiency of OFDM when a quantity of resource blocks is equal to 1, P is equal to 0.75, a modulation order is 2, coding efficiency is 5, and a length of a time domain cyclic prefix is 25%. It can be learned from FIG. 18 that, in a static scenario, when a signal-to-noise ratio is greater than 4 dB, spectral efficiency of APRS is greater than the spectral efficiency of OFDM; and when a signal-to-noise ratio is approximately greater than 5.5 dB, spectral efficiency of DFT-s-APRS is greater than spectral efficiency of DFT-s-OFDM. In a high-speed movement scenario, when a signal-to-noise ratio is approximately greater than 5.5 dB, spectral efficiency of APRS is greater than the spectral efficiency of OFDM; and when a signal-to-noise ratio is approximately greater than 9.5 dB, spectral efficiency of DFT-s-APRS is greater than spectral efficiency of DFT-s-OFDM. When a time-frequency grid is decrypted, the spectral efficiency of the APRS is improved relative to OFDM.

It can be learned from the foregoing comparison that, compared with an OFDM signal, the first signal provided in this application can be used to reduce out-of-band leakage, improve spectral efficiency, and reduce a block error rate in the high-speed movement scenario.

In addition to OFDM, in a 5G standard process, a series of time-frequency non-orthogonal waveform solutions and Faster-than-Nyquist signaling schemes are formed based on different design solutions of a constellation diagram, a shaping filtering, and a time-frequency grid in a multicarrier technology. Some waveform solutions and typical features thereof are shown in Table 2.

Herein, the following terms are described:

FTN is Faster-than-Nyquist signaling: Faster-than-Nyquist.

SEFDM is spectrally efficient frequency-division multiplexing: spectrally efficient frequency-division multiplexing.

GFDM is generalized frequency-division multiplexing: generalized frequency-division multiplexing.

An FBMC is a filter bank multicarrier: filter bank multicarrier.

OQAM is offset quadrature amplitude modulation: offset quadrature amplitude modulation.

TABLE 2

| Waveform solution | | Orthogonality by shift | Time-frequency centralization | Grid tightness | Typical feature |
|---|---|---|---|---|---|
| FTN | | Non-orthogonal pulse | Divergence | Time domain pulse interval multiplied by a subcarrier spacing <1 | Density of time domain pulses is increased, and all time domain pulses are non-orthogonal. |
| SEFDM | | Non-orthogonal subcarrier | Divergence | Time domain pulse interval multiplied by a subcarrier spacing <1 | Density of subcarriers is increased, and all subcarriers are non-orthogonal. |
| GFDM | | Non-orthogonal | Divergence | Time domain pulse interval multiplied by a subcarrier spacing >1 | Time domain pulses partially overlap, subcarriers are orthogonal to each other, and a time domain cyclic prefix is introduced. |
| FBMC | QAM | Complex number domain orthogonality | Divergence | Time domain pulse interval multiplied by a subcarrier spacing = 1 | Sub-carriers and pulses whose indexes are odd numbers are inconsecutive, and sub-carriers and pulses whose indexes are even numbers are time-frequency centralized. |
| | OQAM | Real number domain orthogonality | Centralization | Time domain pulse interval multiplied by a subcarrier spacing = 1 | A time domain pulse is time-frequency centralized, only a real part is orthogonal, and a time domain cyclic prefix does not need to be introduced. |

It can be learned from Table 2 that inter-symbol interference exists between all time domain pulses in FTN, and intercarrier interference exists between all subcarriers in SEFDM, to increase equalization complexity of a receiver. However, for the first signal provided in this application, interference only exists between some subcarriers and some time domain pulses. Therefore, compared with FTN and SEFDM, inter-symbol interference and inter-subcarrier interference can be reduced in this application, to reduce equalization complexity of the receiver.

Compared with GFDM in which subcarriers are orthogonal to each other, density of subcarriers of the first signal provided in this application is increased, and interference exists only between some subcarriers. Therefore, a grid tightness degree of the first signal is higher than that in GFDM.

A time domain cyclic prefix does not need to be introduced in FBMC, and a long shaping filter is designed to ensure time-frequency centralization. QAM has orthogonality in the complex number domain, pulses corresponding to odd subcarriers are inconsecutive, and pulses corresponding to even subcarriers have time-frequency concentration. Because inconsecutive pulses lead to too large out-of-band attenuation, it is difficult to apply the inconsecutive pulses actually. The time domain pulses of the first signal provided in this application overlap, to reduce out-of-band attenuation.

Therefore, compared with an existing time-frequency non-orthogonal waveform solution and Faster-than-Nyquist signaling scheme, in this application, there is a significant progress.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It can be understood that, in the foregoing embodiments, the methods and/or steps implemented by the first communication apparatus may also be implemented by a component (for example, a chip or a circuit) that can be used in the first communication apparatus, and the methods and/or steps implemented by the second communication apparatus may also be implemented by a component that can be used in the second communication apparatus.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the terminal device in the method embodiments, an apparatus including the terminal device, or a component that can be used in the terminal device. Alternatively, the communication apparatus may be the network device in the method embodiments, an apparatus including the foregoing network device, or a component that can be used in the network device. It can be understood that, to implement the foregoing functions, the communication apparatus includes a corresponding hardware structure and/or software module for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by using hardware or hardware driven by computer software depends on a particular application and design constraint of the technical solutions. A person skilled in the art may use different methods to implement the described functions for each particular application, but it should not be considered that the implementation goes beyond the scope of this application.

In embodiments of this application, the communication apparatus may be divided into functional modules based on the method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 19:
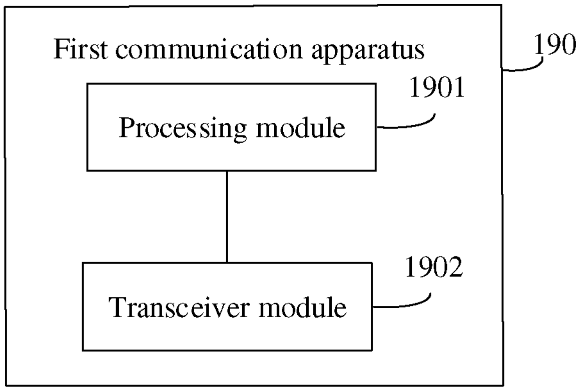
FIG. 19 is a schematic diagram of a structure of a first communication apparatus according to an embodiment of this application.

For example, the communication apparatus is the first communication apparatus in the method embodiments. FIG. 19 is a schematic diagram of a structure of a first communication apparatus 190. The first communication apparatus 190 includes a processing module 1901 and a transceiver module 1902. The transceiver module 1902 may also be referred to as a transceiver unit, and is configured to implement a sending function and/or a receiving function. For example, the transceiver module 1902 may be a transceiver circuit, a transceiver machine, a transceiver, or a communication interface.

The transceiver module 1902 may include a receiving module and a sending module, and the receiving module and the sending module are respectively configured to perform receiving and sending steps performed by the first communication apparatus in the method embodiments. The processing module 1901 may be configured to perform a step other than the receiving and sending steps performed by the first communication apparatus in the method embodiments.

For example, the processing module 1901 is configured to generate a first signal. A symbol included in the first signal is carried on $K+2(M-1)$ subcarriers, and a time domain pulse used to shape the subcarriers satisfies the following condition: a width of each of some or all side lobes of a spectrum of the time domain pulse is equal to $1/M$ of a main lobe width, a subcarrier spacing between adjacent subcarriers is $1/M$ of the main lobe width, start $M-1$ subcarriers and last $M-1$ subcarriers in the $K+2(M-1)$ subcarriers are redundant subcarriers, $K$ is a positive integer, and $M$ is a positive integer greater than 1. The transceiver module 1902 is configured to send the first signal.

All related content of the steps in the method embodiments may be cited in function descriptions of corresponding functional modules. Details are not described herein again.

In this embodiment, the first communication apparatus 190 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, if the terminal device is used as the first communication apparatus, a person skilled in the art may figure out that the first communication apparatus 190 may be in a form of the terminal device 40 shown in FIG. 5.

For example, the processor 401 in the terminal device 40 shown in FIG. 5 may invoke computer-executable instructions stored in the memory 402, so that the terminal device 40 performs the signal generation method in the method embodiments.

Specifically, the processor 401 in the terminal device 40 shown in FIG. 5 may invoke the computer-executable instructions stored in the memory 402, to implement functions/implementation processes of the processing module 1901 and the transceiver module 1902 in FIG. 19. Alternatively, the processor 401 in the terminal device 40 shown in FIG. 5 may invoke the computer-executable instructions stored in the memory 402, to implement functions/implementation processes of the processing module 1901 in FIG. 19, and the transceiver 403 in the terminal device 40 shown in FIG. 5 may implement functions/implementation processes of the transceiver module 1902 in FIG. 19.

Because the first communication apparatus 190 provided in this embodiment may execute the signal generation method, for technical effects that can be achieved by the first communication apparatus 190, refer to the method embodiments. Details are not described herein again.

Figure 20:
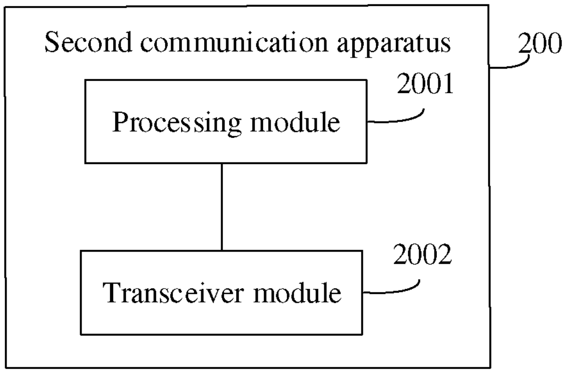
FIG. 20 is a schematic diagram of a structure of a second communication apparatus according to an embodiment of this application.

Alternatively, for example, the communication apparatus is the second communication apparatus in the method embodiments. FIG. 20 is a schematic diagram of a structure of a second communication apparatus 200. The second communication apparatus 200 includes a processing module 2001 and a transceiver module 2002. The transceiver module 2002 may also be referred to as a transceiver unit, and is configured to implement a sending function and/or a receiving function. For example, the transceiver module 2002 may be a transceiver circuit, a transceiver machine, a transceiver, or a communication interface.

The transceiver module 2002 may include a receiving module and a sending module, and the receiving module and the sending module are respectively configured to perform receiving and sending steps performed by the second communication apparatus in the method embodiments. The processing module 2001 may be configured to perform a step other than the receiving and sending steps performed by the second communication apparatus in the method embodiments.

For example, the transceiver module 2002 is configured to receive a first signal. A symbol included in the first signal is carried on K+2(M−1) subcarriers, and a time domain pulse used to shape the subcarriers satisfies the following condition: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1. The processing module 2001 is configured to send the first signal.

All related content of the steps in the method embodiments may be cited in function descriptions of corresponding functional modules. Details are not described herein again.

In this embodiment, the second communication apparatus 200 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, if the network device is used as the second communication apparatus, a person skilled in the art may figure out that the second communication apparatus 200 may be in a form of the network device 50 shown in FIG. 5.

For example, the processor 501 in the network device 50 shown in FIG. 5 may invoke computer-executable instructions stored in the memory 502, so that the network device 50 performs the signal generation method in the method embodiments.

Specifically, the processor 501 in the network device 50 shown in FIG. 5 may invoke the computer-executable instructions stored in the memory 502, to implement functions/implementation processes of the processing module 2001 and the transceiver module 2002 in FIG. 20. Alternatively, the processor 501 in the network device 50 shown in FIG. 5 may invoke the computer-executable instructions stored in the memory 502, to implement functions/implementation processes of the processing module 2001 in FIG. 20, and the transceiver 503 in the network device 50 shown in FIG. 5 may implement functions/implementation processes of the transceiver module 2002 in FIG. 20.

Because the second communication apparatus 200 provided in this embodiment may execute the signal generation method, for technical effects that can be achieved by the second communication apparatus 200, refer to the method embodiments. Details are not described herein again.

Optionally, an embodiment of this application further provides a communication apparatus (for example, the communication apparatus may be a chip or a chip system). The communication apparatus includes a processor, configured to implement the method in any one of the method embodiments. In a possible design, the communication apparatus further includes a memory. The memory is configured to store necessary program instructions and necessary data. The processor may invoke program code stored in the memory, to indicate the communication apparatus to perform the method in any one of the method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (the computer-executable instructions are stored in the memory, and may be directly read from the memory, or may pass through another component) and transmit the computer-executable instructions to the processor. When the communication apparatus is a chip system, the communication apparatus may include a chip, or may include a chip and another discrete component. This is not specifically limited in this embodiment of this application.

Optionally, an embodiment of this application further provides a communication apparatus. The communication apparatus may include a processor and an interface circuit. The interface circuit is configured to communicate with a module other than the communication apparatus. The processor may be configured to execute a computer program or instructions, so that the communication apparatus implements the method in any one of the method embodiments. In some scenarios, the communication apparatus may be a chip or a chip system.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like. In embodiments of this application, the computer may include the foregoing described apparatus.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a great effect.

Although this application is described with reference to specific features and all embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A method, comprising:

receiving, by a second communication apparatus, a first signal, wherein a symbol comprised in the first signal is carried on K+2(M−1) subcarriers, and the K+2(M−1) subcarriers are shaped using a time domain pulse that satisfies the following: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1; and demodulating, by the second communication apparatus, the first signal.

2. The method according to claim 1, wherein the first signal comprises a time domain self-cyclic pulse signal that comprises L time domain pulses and that has a length of βTL, T is a window length of the time domain pulse of the L time domain pulses, βT is a pulse interval between adjacent time domain pulses in the L time domain pulses, L is a positive integer, and β is a positive number.

3. The method according to claim 2, wherein β is greater than or equal to 1/M, and is less than or equal to 1.

4. The method according to claim 2, wherein the first signal satisfies:

$$s(t)=\begin{cases}\sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a kth subcarrier, k∈{1,2, . . . , K+2(M−1)}, and l∈{1,2, . . . , L}; or the first signal further comprises a time domain cyclic prefix, and the first signal satisfies:

$$s(t)=\begin{cases}\sum_{k=0}^{K+(2M-1)-1}\bar{a}_{k,L-1}g(t+\beta T)e^{j2\pi(k-1-K/2)(t+\beta T)/T}+\sum_{k=0}^{K+(2M-1)-1}\bar{a}_{k,L}g(t)e^{j2\pi(k-1-K/2)t/T}, & -T_{CP}\le t<0\\ \sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a kth subcarrier, k∈{1,2, . . . , K+2(M−1)}, l∈{1,2, . . . , L}, and, $T_{CP}$ is a length of the time domain cyclic prefix.

5. The method according to claim 2, wherein β is equal to ½.

6. The method according to claim 1, wherein M is equal to 2, and the time domain pulse is a raised cosine pulse, a window length of the raised cosine pulse is T, and a roll-off factor of the raised cosine pulse is 1.

7. The method according to claim 1, wherein the symbol comprised in the first signal is a modulated symbol; or the symbol comprised in the first signal is a symbol obtained after K-dimensional discrete Fourier transform spread is performed on a modulated symbol.

8. The method according to claim 1, wherein:

the starting M−1 subcarriers carry a frequency domain cyclic prefix, and the last M−1 subcarriers carry a frequency domain cyclic suffix; or the starting M−1 subcarriers and the last M−1 subcarriers are padded with zero.

9. An apparatus, comprising:

at least one processor coupled to a non-transitory memory, the non-transitory memory storing a computer program or instructions, which when executed by the at least one processor, cause the apparatus to:

receive a first signal, wherein a symbol comprised in the first signal is carried on K+2(M−1) subcarriers, and the K+2(M−1) subcarriers are shaped using a time domain pulse that satisfies following: a width of each of some or all side lobes of a spectrum of the time domain pulse is equal to 1/M of a main lobe width, a subcarrier spacing between adjacent subcarriers is 1/M of the main lobe width, start M−1 subcarriers and last M−1 subcarriers in the K+2(M−1) subcarriers are redundant subcarriers, K is a positive integer, and M is a positive integer greater than 1; and demodulate the first signal.

10. The apparatus according to claim 9, wherein the first signal comprises a time domain self-cyclic pulse signal that comprises L time domain pulses and that has a length of βTL, T is a window length of the time domain pulse, βT is a pulse interval between adjacent time domain pulses of the L time domain pulses, L is a positive integer, and β is a positive number.

11. The apparatus according to claim 10, wherein β is greater than or equal to 1/M, and is less than or equal to 1.

12. The apparatus according to claim 10, wherein the first signal satisfies:

$$s(t)=\begin{cases}\sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a kth subcarrier, k∈{1,2, . . . , K+2(M−1)}, and l∈{1,2, . . . , L}; or the first signal further comprises a time domain cyclic prefix, and the first signal satisfies:

$$s(t)=\begin{cases}\sum_{k=0}^{K+(2M-1)-1}\bar{a}_{k,L-1}g(t+\beta T)e^{j2\pi(k-1-K/2)(t+\beta T)/T}+\sum_{k=0}^{K+(2M-1)-1}\bar{a}_{k,L}g(t)e^{j2\pi(k-1-K/2)t/T}, & -T_{CP}\le t<0\\ \sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a kth subcarrier, k∈{1,2, . . . , K+2(M−1)}, l∈{1,2, . . . , L}, and $T_{CP}$ is a length of the time domain cyclic prefix.

13. The apparatus according to claim 9, wherein M is equal to 2, and the time domain pulses are raised cosine pulses, a window length of the raised cosine pulses is T, and a roll-off factor of the raised cosine pulses is 1.

14. The apparatus according to claim 9, wherein:

the symbol comprised in the first signal is a modulated symbol; or the symbol comprised in the first signal is a symbol obtained after K-dimensional discrete Fourier transform spread is performed on a modulated symbol.

15. A non-transitory computer-readable storage medium, comprising a computer program or instructions, wherein when the computer program or the instructions run on an apparatus, the apparatus is caused to:

receive a first signal, wherein a symbol comprised in the first signal is carried on K+2(M−1) subcarriers, and the K+2(M−1) subcarriers are shaped using a time domain pulse that satisfies following: a width of each of some or all side lobes of a spectrum of the time domain pulse is equal to 1/M of a main lobe width, a subcarrier spacing between adjacent subcarriers is 1/M of the main lobe width, starting M−1 subcarriers and last M−1 subcarriers in the K+2(M−1) subcarriers are redundant subcarriers, K is a positive integer, and M is a positive integer greater than 1; and demodulate the first signal.

16. The non-transitory computer-readable storage medium according to claim 15, wherein the first signal comprises a time domain self-cyclic pulse signal that comprises L time domain pulses and that has a length of βTL, T is a window length of the time domain pulse, βT is a pulse interval between adjacent time domain pulses of the L time domain pulses, L is a positive integer, and β is a positive number.

17. The non-transitory computer-readable storage medium according to claim 16, wherein β is greater than or equal to 1/M, and is less than or equal to 1.

18. The non-transitory computer-readable storage medium according to claim 16, wherein the first signal satisfies:

$$s(t)=\begin{cases}\sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a kth subcarrier, k∈{1,2, . . . , K+2(M−1)}, and l∈{1, 2, . . . , L}; or the first signal further comprises a time domain cyclic prefix, and the first signal satisfies:

$$s(t)=\begin{cases}\sum_{k=0}^{K+(2M-1)-1}\bar{a}_{k,L-1}g(t+\beta T)e^{j2\pi(k-1-K/2)(t+\beta T)/T}+\sum_{k=0}^{K+(2M-1)-1}\bar{a}_{k,L}g(t)e^{j2\pi(k-1-K/2)t/T}, & -T_{CP}\le t<0\\ \sum_{k=0}^{K+(2M-1)-1}\bar{a}_{k,1}g(t-\beta T)e^{j2\pi(k-1-K/2)(t-\beta T)/T}+\sum_{k=0}^{K+(2M-1)-1}\bar{a}_{k,L}g(t)e^{j2\pi(k-1-K/2)t/T}, & 0\le t<\beta T\\ \sum_{l=1}^{L}\sum_{k=0}^{K+(2M-1)-1}\bar{a}_{k,l}g(t-\beta lT)e^{j2\pi(k-1-K/2)(t-\beta lT)/T}, & \beta T\le t<\beta TL\end{cases},$$

wherein s(t) is the first signal, g(t) is the time domain pulses, $\bar{a}_{k,l}$ is a symbol carried on an lth time domain pulse of a Kth subcarrier, $k\in\{1,2, \ldots, K+2(M-1)\}$, $l\in\{1,2, \ldots, L\}$, and $T_{CP}$ is a length of the time domain cyclic prefix.

19. The non-transitory computer-readable storage medium according to claim 15, wherein M is equal to 2, and the time domain pulses are a raised cosine pulse, a window length of the raised cosine pulses is T, and a roll-off factor is of the raised cosine pulses 1.

20. The non-transitory computer-readable storage medium according to claim 15, wherein the symbol comprised in the first signal is a modulated symbol; or the symbol comprised in the first signal is a symbol obtained after K-dimensional discrete Fourier transform spread is performed on a modulated symbol.

* * * * *